United States Patent
Ji et al.

(10) Patent No.: US 12,295,517 B2
(45) Date of Patent: May 13, 2025

(54) COOK TOP, RANGE HOOD AND CONTROL METHODS THEREOF

(71) Applicant: Samsung Electronics Co., Ltd., Suwon-si (KR)

(72) Inventors: Sook-young Ji, Suwon-si (KR); Jin-seok Kwon, Suwon-si (KR); Seung-hun Choi, Hwaseong-si (KR); Dong-wook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 18/304,210

(22) Filed: Apr. 20, 2023

(65) Prior Publication Data

US 2023/0296262 A1  Sep. 21, 2023

Related U.S. Application Data

(60) Continuation of application No. 16/817,479, filed on Mar. 12, 2020, now Pat. No. 11,668,472, which is a
(Continued)

(30) Foreign Application Priority Data

Sep. 9, 2016  (KR) .......................... 10-2016-0116458

(51) Int. Cl.
*A47J 27/62* (2006.01)
*F24C 7/08* (2006.01)
*F24C 15/10* (2006.01)

(52) U.S. Cl.
CPC .............. *A47J 27/62* (2013.01); *F24C 7/087* (2013.01); *F24C 15/105* (2013.01)

(58) Field of Classification Search
CPC ....... A47J 27/62; F24C 15/105; F24C 15/106; F24C 7/087
(Continued)

(56) References Cited

U.S. PATENT DOCUMENTS 7,866,312 B2  1/2011  Erdmann
10,085,585 B2  10/2018  Siegel et al.
(Continued)

FOREIGN PATENT DOCUMENTS

CN  104298138 A  1/2015
CN  105222175 A  1/2016
(Continued)

OTHER PUBLICATIONS

International Search Report and Written Opinion, dated Nov. 20, 2017, regarding International Application No. PCT/KR2017/008054, 12 pages.
(Continued)

*Primary Examiner* — Reginald Alexander

(57) ABSTRACT

A cook top includes an inputter configured to receive input of a user manipulation, and a cooker configured to heat a cooking device placed on the cook top. A communicator is configured to perform communication with a user terminal device and a range hood. A processor is configured to: control an operating state of the cooker according to the user manipulation, transmit a signal for controlling an operating state of the range hood to correspond to the operating state of the cooker to the range hood, and control the communicator to transmit state information of the cook top that includes information of the operating state of the cooker to the user terminal device.

20 Claims, 21 Drawing Sheets

Related U.S. Application Data division of application No. 15/645,930, filed on Jul. 10, 2017, now Pat. No. 10,670,278.

(58) Field of Classification Search
USPC .......... 99/331, 333, 337, 338, 325; 219/483, 219/484, 489, 448.12, 462.1, 707, 757; 126/299 R, 299 D
See application file for complete search history.

(56) References Cited

U.S. PATENT DOCUMENTS

| | | | |
|---|---|---|---|
| 10,657,719 B2 | 5/2020 | Tezel et al. | |
| 2003/0163325 A1* | 8/2003 | Maase | F24C 15/2021 704/E15.045 |
| 2006/0278216 A1 | 12/2006 | Gagas et al. | |
| 2009/0048714 A1 | 2/2009 | Hanawalt | |
| 2013/0092032 A1 | 4/2013 | Cafferty et al. | |
| 2015/0226439 A1 | 8/2015 | Mikulec | |
| 2016/0213033 A1 | 7/2016 | Kim et al. | |
| 2017/0023260 A1 | 1/2017 | Charpentier et al. | |
| 2017/0205077 A1 | 7/2017 | Seo | |
| 2018/0266695 A1* | 9/2018 | Yu | F24C 3/122 |
| 2023/0129115 A1* | 4/2023 | Sinur | H04L 12/2816 126/299 D |

FOREIGN PATENT DOCUMENTS

| | | |
|---|---|---|
| CN | 205606653 U | 9/2016 |
| DE | 102012210844 A1 | 2/2013 |
| DE | 102013226362 A1 | 6/2015 |
| DE | 102014220273 A1 | 4/2016 |
| EP | 2894816 A1 | 7/2015 |
| EP | 3211322 A1 | 8/2017 |
| FR | 3018171 A1 | 9/2015 |
| JP | 2007-205669 A | 8/2007 |
| JP | 2008-192494 A | 8/2008 |
| JP | 2012-032102 A | 2/2012 |
| JP | 5151178 B2 | 2/2013 |
| JP | 2015-158343 A | 9/2015 |
| JP | 2016-029318 A | 3/2016 |
| KR | 20-1995-0007815 Y1 | 9/1995 |
| KR | 10-0392395 B1 | 7/2003 |
| KR | 10-2004-0083558 A | 10/2004 |
| KR | 10-2005-0047867 A | 5/2005 |
| KR | 10-2006-0111289 A | 10/2006 |
| KR | 10-2010-0093920 A | 8/2010 |
| KR | 10-2011-0015817 A | 2/2011 |
| KR | 10-2015-0022393 A | 3/2015 |
| KR | 10-2015-0083542 A | 7/2015 |
| KR | 10-2015-0127776 A | 11/2015 |
| KR | 10-1588224 B1 | 1/2016 |
| KR | 10-2016-0012849 A | 2/2016 |
| WO | 2007138379 A1 | 12/2007 |
| WO | 2015168243 A1 | 11/2015 |
| WO | 2016018000 A1 | 2/2016 |

OTHER PUBLICATIONS

Supplementary European Search Report dated Jun. 5, 2019 in connection with European Patent Application No. 17 84 8978, 10 pages.
Office Action dated Apr. 3, 2020 in connection with Chinese Patent Application No. 201780047704.6, 17 pages.
The Second Office Action dated Nov. 26, 2020 in connection with Chinese Application No. 201780047704.6, 11 pages.
Communication pursuant to Article 94(3) EPC dated Nov. 24, 2020 in connection with European Application No. 17848978.7, 7 pages.
Supplementary European Search Report dated Apr. 21, 2022, in connection with European Application No. 21215425.6, 10 pages.
Request for the Submission of an Opinion dated Oct. 5, 2022 in connection with Korean Patent Application No. 10-2016-0116458, 19 pages.
Request for the Submission of an Opinion dated Jan. 31, 2023, in connection with Korean Patent Application No. 10-2016-0116458, 21 pages.
Request for the Submission of an Opinion dated Dec. 2, 2023, in connection with Korean Application No. 10-2023-0101308, 13 pages.
European Search Report dated Jul. 12, 2024, in connection with European Application No. 24172713.0, 10 pages.
Patent Rejection Decision dated Aug. 26, 2024, in connection with Korean Application No. 10-2023-0101308, 6 pages.

* cited by examiner

FIG. 8A
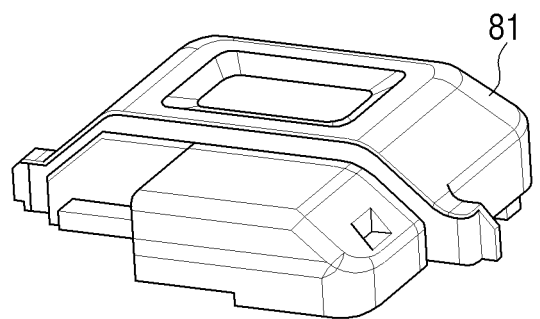
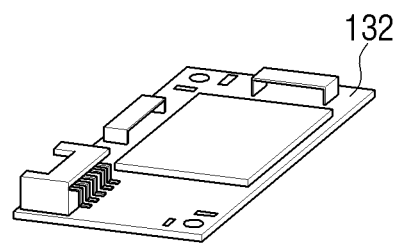
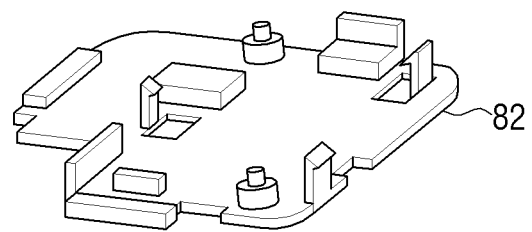

FIG. 8B
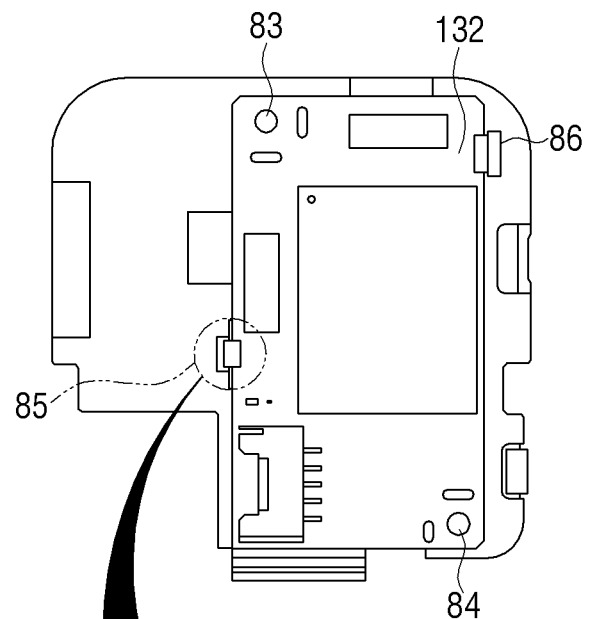
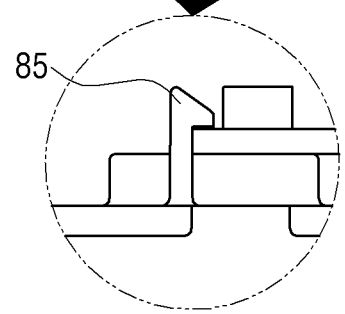
FIG. 8C
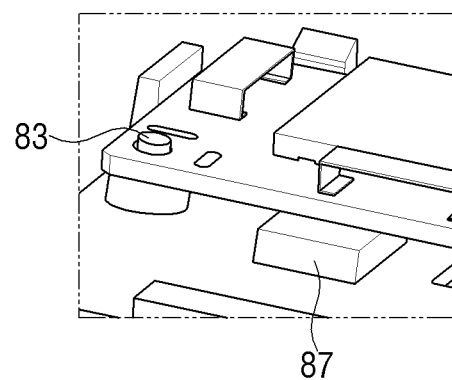

COOK TOP, RANGE HOOD AND CONTROL METHODS THEREOF

CROSS-REFERENCE TO RELATED APPLICATIONS

This application is a continuation of application Ser. No. 16/817,479, filed Mar. 12, 2020, which is a divisional of application Ser. No. 15/645,930, filed Jul. 10, 2017, now U.S. Pat. No. 10,670,278, which claims priority from Korean Patent Application No. 10-2016-0116458, filed on Sep. 9, 2016, in the Korean Intellectual Property Office, the disclosures of which are incorporated herein by reference in their entirety.

BACKGROUND

1. Field

Apparatuses and methods consistent with the present disclosure relate to a cook top, a range hood and a control method thereof, and more particularly, to a cook top and a range hood that are capable of performing wireless communication between each other, and a control method thereof.

2. Description of Related Art

Recently, the Internet of things (IoT) technology has enabled various electronic products, such as home appliance products and electronic devices, to share information via networks.

A cook top generally refers to an electric range or gas range having a plurality of burners to heat cooking containers or food to be cooked. A range hood refers to a ventilating device for exhausting through an exhaust fan smoke or odors generated from the cook top. A range hood is typically installed together with a cook top.

However, until now, there have been no attempts to combine IoT technology with a cook top, a range hood, and a user terminal device for controlling the cook top and the range hood. Thus, there is a need for a technology that could enable a user to check and control the operating state of the cook top and the range hood through the user terminal device.

SUMMARY

To address the above-discussed deficiencies, it is an object to provide a cook top and a range hood that allow a user to remotely check and control the operating states thereof, and a control method thereof.

According to an embodiment of the present disclosure, there is provided a cook top including an inputter; a cooker configured to heat a cooking device placed on the cook top; a communicator configured to perform communication with a user terminal device and a range hood; and a processor configured to receive input of a user manipulation through the inputter, control an operating state of the cooker according to the user manipulation, transmit a signal for controlling an operating state of the range hood to correspond to the operating state of the cooker to the range hood, and control the communicator to transmit state information of the cook top that includes information of the operating state of the cooker to the user terminal device.

Here, the processor may transmit a signal for operating the range hood when the cooker is operated and for stopping the range hood from operating when the cooker is stopped from operating, to the range hood.

Further, the communicator may include a first communicator that includes a Bluetooth module configured to perform communication with the range hood in a Bluetooth method; and a second communicator that includes a Wi-Fi module configured to perform communication with the user terminal device in a Wi-Fi method.

Further, the state information of the cook top may include at least one of whether or not the cooker is being operated, operating state information of each of a plurality of burners included in the cooker, fire power level and timer information.

Further, in response to receiving state information of the range hood from the range hood, the processor may process the received state information and transmit the same to the user terminal device.

Further, in response to receiving a control command for controlling the range hood from the user terminal device, the processor may transmit a signal for operating the range hood according to the control command, to the range hood.

Further, the processor may receive timer setting information from the user terminal device, and transmit information of the time left until a timer ends as time elapses and a signal notifying that the timer ended based on the received timer setting information, to the user terminal device.

Further, the cooker may include a plurality of burners configured to convert electric energy into thermal energy to generate heat; and an upper plate provided at an upper side of the burner to transmit heat to the cooking device, and the Bluetooth module and the Wi-Fi module may be spaced apart from each other and be installed on different surfaces on a main body of the cook top to reduce or minimize signal interference.

Further, the Bluetooth module may be included in an inner space formed as a first holder including at least one groove and a second holder including a projection corresponding to the groove are geared to each other.

Further, the Wi-Fi module may be included in an inner space formed as a first holder including at least one groove and a second holder including a projection corresponding to the groove are geared to each other, and thus may have a structure that is separable from the cook top, and the second holder may include a stumbling block configured to seat the Wi-Fi module and a mis-assembly prevention block.

Meanwhile, according to another embodiment of the present disclosure, there is provided a control method of a cook top, the method including receiving input of a user manipulation; controlling an operating state of a cooker for heating a cooking device placed on the cook top, according to the user manipulation; and transmitting a signal for controlling an operating state of the range hood to correspond to the operating state of the cooker to the range hood, and transmitting state information of the cook top that includes information of the operating state of the cooker to a user terminal device configured to perform communication with the cook top.

Here, the transmitting comprises transmitting to the range hood a signal for operating the range hood when the cooker is operated, and for stopping the range hood from operating when the cooker is stopped from operating.

Further, the cook top may perform communication with the range hood in a Bluetooth method, and perform communication with the user terminal device in a Wi-Fi method.

Further, the state information of the cook top may include at least one of whether or not the cooker is being operated, operating state information of each of a plurality of burners included in the cooker, fire power level and timer information.

Further, the method may further include receiving a control command for controlling the range hood from the user terminal device; and transmitting a signal for operating the range hood according to the control command, to the range hood.

Meanwhile, according to another embodiment of the present disclosure, there is provided a range hood including an exhaust fan configured to discharge indoor air to outdoors through an exhaust pipe; a communicator configured to perform communication with a cook top; and a processor configured to, in response to receiving a signal for controlling an operating state of the exhaust fan to correspond to an operating state of the cook top from the cook top, control the operating state of the exhaust fan to correspond to the operating state of the cook top based on the received signal, and control the communicator to transmit state information of the range hood to the cook top.

Here, the processor may control the exhaust fan to operate in response to receiving from the cook top a signal notifying that the cook top is being operated, and control the exhaust fan to stop operating in response to receiving from the cook top a signal notifying that the cook top is stopped from operating.

Further, the range hood may further include an inputter; and a display, wherein the processor may perform pairing with the cook top in response to receiving a pairing command input through the inputter, and display an indicator configured to notify through the display that it is in a paired state with the cook top when the pairing with the cook top is completed.

Further, the range hood may further include a light, wherein state information of the range hood may include information of operating states of the exhaust fan and the light.

Further, the communicator may include a Bluetooth module configured to perform communication with the cook top in a Bluetooth method, and the Bluetooth module may be disposed at an end of a lower portion of the inputter and the display so that it does not overlap with the inputter and the display.

Meanwhile, according to an embodiment of the present disclosure, there is provided a control method of a range hood, the method including receiving a signal for controlling an operating state of an exhaust fan provided in the range hood to correspond to an operating state of the cook top, from a cook top; in response to receiving the signal, controlling an operating state of the exhaust fan to correspond to the operating state of the cook top based on the received signal; and transmitting state information of the range hood to the cook top.

Here, the controlling the operating state may operate the exhaust fan in response to receiving from the cook top a signal notifying that the cook top is being operated, and stops the exhaust fan from operating in response to receiving from the cook top a signal notifying that the cook top is stopped from operating.

Further, the control method may further include performing pairing with the cook top as a pairing command is input; and providing an indicator notifying that it is in a paired state when the pairing with the cook top is completed.

Meanwhile, according to another embodiment of the present disclosure, there is provided a cooking system including a cook top, a range hood and a user terminal device, the system including the cook top configured to transmit a signal for operating an exhaust fan provided in the range hood when the cook top is being operated according to a user manipulation to the range hood paired with the cook top, and transmit state information of the cook top to the user terminal device; the range hood configured to operate the exhaust fan and transmit state information of the range hood in response to receiving the signal from the cook top, to the cook top; and a user terminal device configured to receive the state information of the cook top and the state information of the range hood from the cook top, and transmit a control command for controlling the cook top and the range hood to the cook top.

Here, the cook top may transmit a signal for stopping the exhaust fan from operating when the cook top is stopped from operating, to the range hood.

Further, the range hood and the cook top may perform communication in a Bluetooth method, and the user terminal device and the cook top may perform communication in a Wi-Fi method.

Further, in response to receiving state information of the range hood from the range hood, the cook top may process the received state information and transmit the same to the user terminal device.

Further, in response to receiving a control command for controlling the range hood from the user terminal device, the cook top may transmit to the range hood a signal for operating the range hood according to the control command.

According to the various embodiments of the present disclosure, the user may check the operating states of the cook top and the hood and control their operations more conveniently.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 8A-8C are views provided to explain a structure of a Wi-Fi module provided in the cook top, according to an embodiment of the present disclosure;

DETAILED DESCRIPTION

Figure 1:
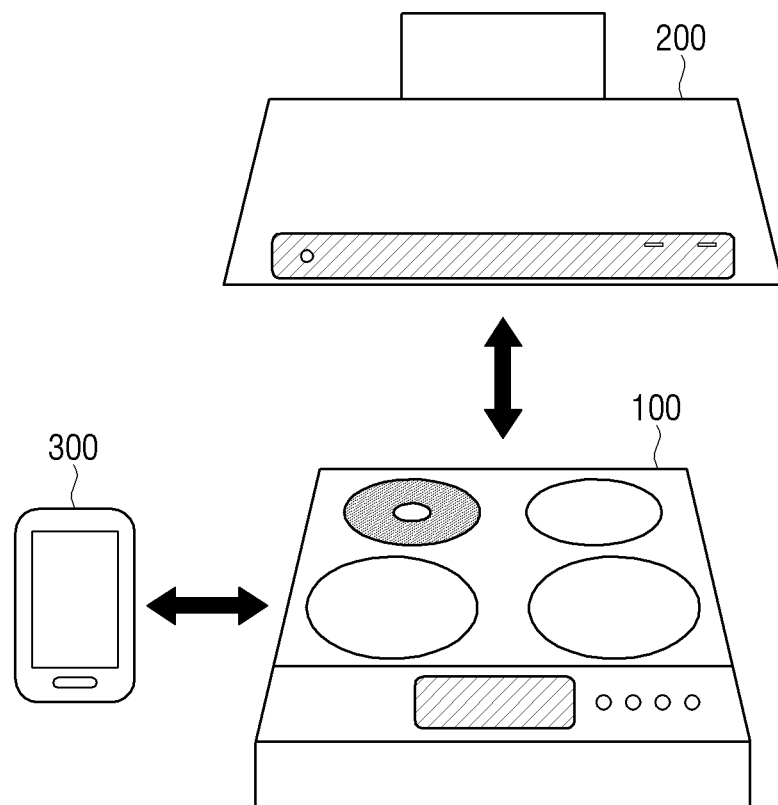
FIG. 1 is a view provided to explain a cooking system, according to an embodiment of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Prior to explaining the present disclosure in detail, explanation will be made on the method by which the present specification and drawings are disclosed.

The terms used in the present specification and the claims are general terms selected in consideration of the functions of the various embodiments of the present disclosure. However, these terms may vary depending on the intention, legal or technical interpretation, and emergence of new technologies and the like of those skilled in the related art. Further, some of the terms may be ones arbitrarily selected by the applicant. Unless there is a specific definition of a term, the term may be construed as defined in the present specification, and based on the overall contents and technological common sense of those skilled in the related art.

Further, like reference numerals indicate like components that perform substantially the same functions throughout the specification. For the sake of convenience of explanation and understanding, different embodiments are described with reference to like reference numerals. That is, even if all the components in the plurality of drawings have like reference numerals, it does not mean that the plurality of drawings refer to only one embodiment.

Further, the terms including numerical expressions such as a first, a second and the like may be used to explain various components, but there is no limitation thereto. These terms are used only for the purpose of differentiating one component from others, without limitation thereto. For example, a numerical expression combined with a component should not limit the order of use or order of arrangement of the component. When necessary, the numerical expressions may be exchanged between components.

In the present specification, a singular expression includes a plural expression unless clearly mentioned otherwise. In this specification, terms such as "include/including" and "have/has" should be construed as designating that there are such characteristics, numbers, steps, operations, elements, components or a combination thereof in the specification, not to exclude the presence or possibility of adding one or more of other characteristics, numbers, steps, operations, elements, components or a combination thereof.

In the embodiments of the present disclosure, terms such as "module", "unit", "part" and the like are terms used to indicate components that may be integrated into at least one module or chip and realized as at least one processor (not illustrated), except when each of them needs to be realized as certain hardware.

Further, in the embodiments of the present disclosure, when it is described that a portion is connected to another portion, the portion may be either connected directly to the other portion, or connected indirectly via another medium. Further, when it is described that a portion includes another component, it does not exclude the possibility of including other components, that is, the portion may further include other components besides the described component, unless specifically disclosed to the contrary.

Hereinafter, the present disclosure will be explained in detail with reference to the drawings attached.

FIG. 1 is a view provided to explain a cooking system, according to an embodiment of the present disclosure.

The cooking system 1000 includes a cook top 100, a range hood 200, and a user terminal device 300.

The cook top 100 is a cooking device configured to generate heat using gas or electricity, and that has one or more burners to heat food to be cooked or cooking containers placed on top of the burners. The cook top 100 may be called a gas range or an electric range depending on the method of generating heat.

Especially, in the case where the cook top 100 is realized as an electric range configured to generate heat by converting electric energy into thermal energy, such cook tops may be classified into inductions, hot plates, highlights and the like depending on the heating element. Inductions use the principle where heat is generated by an inductance action as a cooking container contacts a magnetic substance, and thus they are electric ranges that use exclusive containers having magnetic properties. Hot plates use a method of directly heating a metal plate having heat wires, and highlights use a method where heat wires are distributed in a circular form to heat a ceramic heater. In other words, highlights use a compromised method of a hot plate and an induction. However, the electric ranges are not limited to the aforementioned methods.

The range hood 200 is a ventilating device configured to discharge or purify smoke or smell generated from food being cooked in the cook top 100 through an exhaust pipe that connects a main body of the range hood 200 and outdoors. The range hood 200 is mostly arranged above the cook top 10. The range hood 200 inhales the smoke or smell using suction force generated by an exhaust fan that is supplied with power source and rotates by the received power source, and then exhausts to the outdoors the smoke or smell from which foreign matter has been filtered by a filter.

The user terminal device 300 is a device capable of communicating with the cook top 100, and may be realized as various electronic devices such as, for example, smart phone, tablet PC, notebook PC, remote control, wearable device and the like.

The cook top 100 and the user terminal device 300 may be connected to each other via wireless communication and transceive data between each other. FIG. 1 illustrates that the user terminal device 300 is connected to the cook top 100 to transceive data, and that the cook top 100 and the range hood 200 are connected to transceive data, but it is also possible to have the user terminal device 300 directly connected to the range hood 200 to transceive data therebetween.

Here, the user terminal device 300 may transmit to the cook top 100 a control signal for controlling the cook top 100 or the range hood 200, and the cook top 100 may transmit to the user terminal device 300 operating information of the cook top 100 and operating information of the range hood 200. Further, the cook top 100 may transmit to the range hood 200 a signal notifying the operation of the cook top 100, a signal for controlling the range hood 200 according to a control signal received from the user terminal device 300, and operating information of the range hood 200 to the cook top 100.

Meanwhile, FIG. 1 illustrates an embodiment where the user terminal device 300 is connected to the cook top 100 to transceive data, but it is obvious that the user terminal device 300 may be connected to the range hood 200 to transceive data directly without going through the cook top 100.

Figure 2:
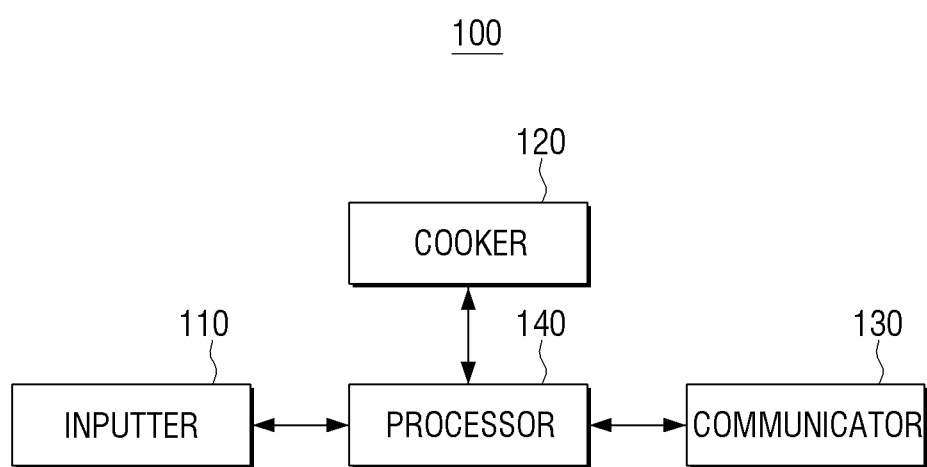
FIG. 2 is a block diagram schematically illustrating a configuration of a cook top, according to an embodiment of the present disclosure.

FIG. 2 is a block diagram schematically illustrating a configuration of the cool top, according to an embodiment of the present disclosure.

Referring to FIG. 2, the cook top 100 includes an inputter 110, a cooker 120, a communicator 130 and a processor 140.

The inputter 110 is configured to receive input for manipulating operations of the cook top 100 from the user. The inputter 110 may be provided with a power source key for supplying power source to the cook top 100 and level keys configured to manipulate fire power (output) of at least one burner included in the cooker 120, a communication key (pairing key) configured to perform communication with the range hood 200 and a key configured to input various control commands regarding cooking. Here, the inputter 110 may adopt a button-type switch, a membrane switch, a dial and the like.

The cooker 120 is a configuration for performing heating a cooking device disposed on an upper portion of a main body of the cook top 100 to perform cooking. In the case where the cook top 100 is realized as an electric range, the cooker 120 may include a burner (not illustrated) configured to convert electric energy into thermal energy to generate heat, a radiator (not illustrated) that surrounds the burner in order to prevent the heat generated from the burner from being transmitted to other components mounted on the cook top 100, and an upper plate (not illustrated) provided on an upper side of the burner to directly transmit heat to the cooking device. In the burner, an inductance heating coil may be used, that generates heat when an alternating current is conducted. Here, the cooker 120 may include at least one or more burners, that is, a plurality of burners of preferably 3, 4 or 5. Here, the plurality of burners may be formed in different sizes or different shapes from one another so that various forms of cooking devices may be heated.

The communicator 130 may perform communication with the range hood 200 and the user terminal device 300 in a wireless communication method. Here, the wireless communication method may be at least one of NFC, Wi-Fi, Wi-Fi Direct and Bluetooth.

The communicator 130 according to an embodiment of the present disclosure may include a first communicator 131 that performs communication with the range hood 200 and a second communicator 132 that performs communication with the user terminal device 300. Here, the first communicator 131 may perform communication through a first communication method and the second communicator 132 may perform communication through a second communication method, and the first communication method and the second communication method may be different from each other. According to an embodiment of the present disclosure, the first communicator 131 may include a Bluetooth module to perform communication with the range hood 200 through Bluetooth, and the second communicator 132 may include a Wi-Fi module to perform communication with the user terminal device 300 through Wi-Fi.

The first communicator 131 may perform pairing with the range hood 200 in a Bluetooth method. Specifically, in response to receiving a connection request from the range hood 200, the first communicator 131 may transmit a unique address, device name and other information of the cook top 100 to the range hood 200. Further, the first communicator 131 may receive unique address, device name and other information of the range hood 200. By providing and receiving connection information in such a way, the cook top 100 and the range hood 200 may be paired to each other. When a connection is established, the cook top 100 may transmit to the range hood 200 a signal for controlling an operating state of the range hood 200 to correspond to an operating state of the cooker 120, and may receive from the range hood 200 state information of the range hood 200.

The second communicator 132 may be wirelessly connected with the user terminal device 300 in a Wi-Fi method. Specifically, the second communicator 132 may be wirelessly connected with the user terminal device 300 through an Access Point (AP), or directly connected with the user terminal device 300 through a Wi-Fi direct method. When a connection is established, the cook top 100 may transmit state information of the cook top 100 to the user terminal device 300, and receive a control command for controlling operations of the cook top 100 from the user terminal device 300. Further, the cook top 100 may convert the state information of the range hood 200 received through the first communicator 313 into state information having a Wi-Fi form, and transmit the converted state information having the Wi-Fi form to the user terminal device 300 through the second communicator 132. Further, the cook top 100 may convert the control signal for controlling the range hood 200 received through the second communicator 132 into a control signal having a Bluetooth form and transmit the same to the range hood 200 through the first communicator 131.

In another example, the communicator 130 may first transceive various connection information such as SSID and session keys to and from the range hood 200 and the user terminal device 300 through an NFC communication method, and then use this information to be connected for communication and then transceive various signals through a Bluetooth method or a Wi-Fi method.

The processor 140 is a configuration for controlling the overall operations of the cook top 106. Especially, the processor 140 may control the operating state of the cooker 120 according to a user manipulation input through the inputter 110, and transmit to the range hood 200 a signal for controlling the operating state of the range hood 200 to correspond to the operating state of the cooker 120.

Specifically, the processor 140 may determine whether or not the cooker 120 is operating, and if it is determined that the cooker 120 is operating, transmit a signal for operating the range hood 200 to the range hood 200, and if it is determined that the cooker 120 is stopped from operating, the processor 140 may transmit a signal for stopping the range hood 200 from operating to the range hood 200. Here, operation of the range hood 200 may mean operation of the exhaust fan 210 provided in the range hood 200.

Figure 3:
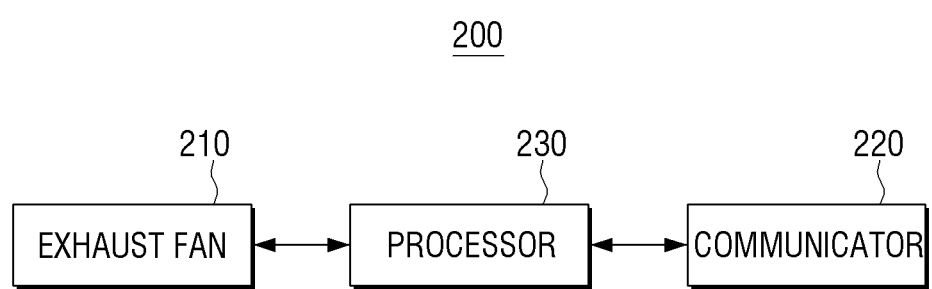
FIG. 3 is a block diagram schematically illustrating a configuration of a range hood, according to an embodiment of the present disclosure.

FIG. 3 is a block diagram schematically illustrating the configuration of the range hood, according to an embodiment of the present disclosure.

Referring to FIG. 3, the range hood 200 includes an exhaust fan 210, a communicator 220 and a processor 230.

The exhaust fan 210 is a configuration for discharging indoor air outdoors through an exhaust pipe. The exhaust pipe is formed in a structure where it is connected to the main body of the range hood 200 and its other end extending outdoors. The exhaust fan 210 may be installed inside the exhaust pipe so that it may inhale the smell and smoke generated in the cook top 100 when cooking food in the cook top 100 and discharge the smell and smoke outdoors.

The communicator 220 is a configuration for performing communication with the cook top 100 in a wireless communication method. According to an embodiment of the present disclosure, the communicator 220 may be provided with a Bluetooth module, and perform a pairing connection with the cook top 100. The communication method of the cook top 100 and the range hood 200 was explained above, and thus detailed explanation will be omitted hereinafter. However, the communication method between the cook top 100 and the range hood 200 is not limited to the aforementioned embodiment, and thus the communication between the cook top 100 and the range hood 200 may be performed in various communication methods including wired and wireless communication methods.

In response to receiving from the cook top 100 the signal for controlling the operating state of the exhaust fan 210 to correspond to the operating state of the cook top 100, the processor 230 may control the operating state of the exhaust fan 210 to correspond to the operating state of the cook top 100 based on the received signal. Specifically, when the cooker 120 is operated in the cook top 100 and cooking is initiated, the cook top 100 may transmit to the range hood 200 a control signal notifying that the cooker 120 is being operated or a control signal for operating the exhaust fan 210 of the range hood 200. In response to receiving the signal from the cook top 100, the processor 230 of the range hood 200 may control the exhaust fan 210 to operate. Further, when the cooker 120 in the cook top 100 is stopped from operating, the cook top 100 may transmit to the range hood 200 a signal notifying that the cooker 120 is stopped from operating or a control signal for stopping the exhaust fan 210 of the range hood 200 from operating. Here, in response to receiving the signal from the cook top 100, the processor 230 of the range hood 200 may control the exhaust fan 210 to stop operating. Further, the processor 230 may further receive information of the operating burner and the fire power level of the operating burner from the cook top 100, and may control the operating intensity level of the exhaust fan 210 based on the received information.

Meanwhile, the processor 230 may control the communicator 220 to transmit the state information of the range hood 200 to the cook top 100. Here, the state information of the range hood 200 may include information of the operating state of the exhaust fan 210 and the operating intensity level of the exhaust fan 210. Further, in another embodiment of the present disclosure, the range hood 200 may further include a light (not illustrated), wherein the state information of the range hood 200 may further include information of the operating state (ON/OFF state) of the light.

Meanwhile, the range hood 200 according to another embodiment of the present disclosure may further include an inputter and a display. The inputter is a configuration for receiving input of a control command for controlling the range hood 200, that is, the control commands regarding the operating intensity level of the exhaust fan 210, operation of the light and the pairing connection with the cook top 100. The display may be a configuration for displaying the state information of the range hood 200, and may display the control state according to the control commands input through the inputter, and may be realized as an LED.

In response to receiving input of the control command for a pairing connection through the inputter, the processor 230 may perform pairing with the cook top 100, and when the pairing with the cook top is completed, the processor 230 may display through the display an indicator notifying that it is in a paired state.

Figure 4:
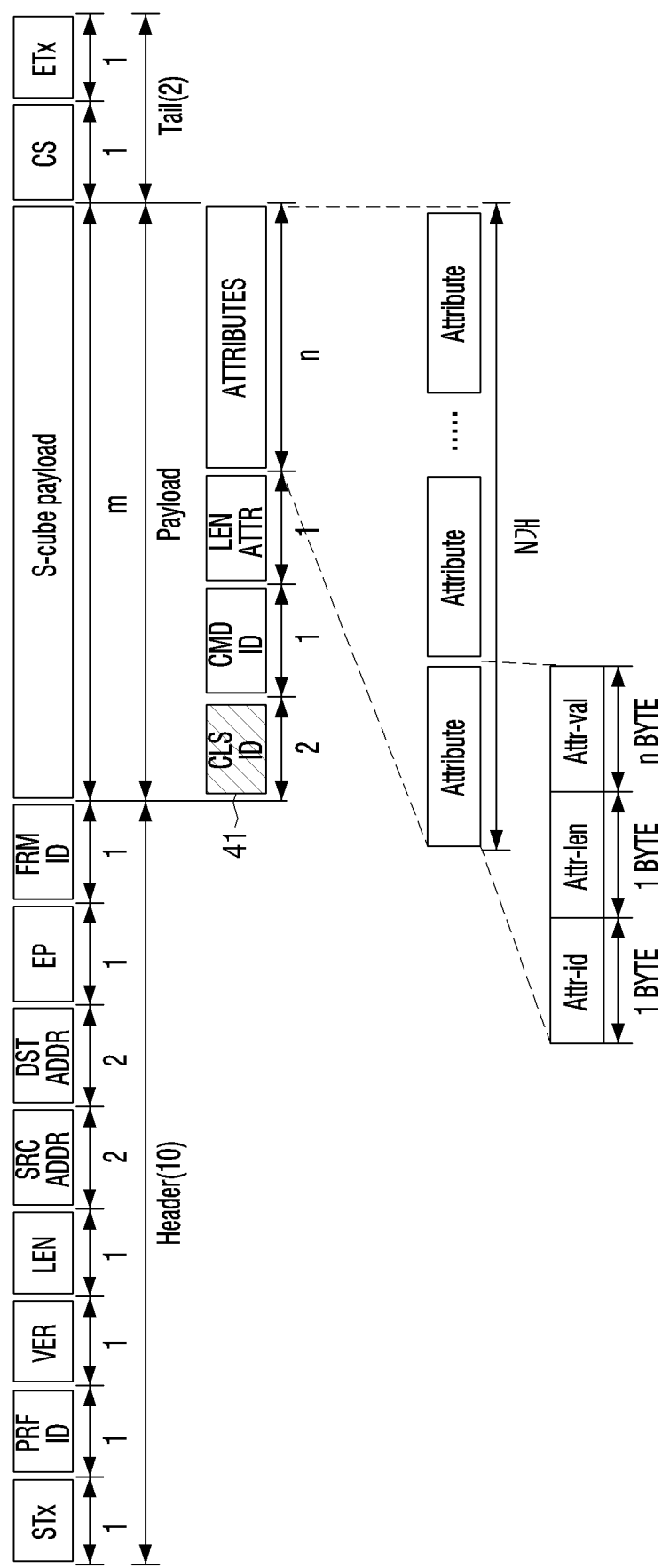
FIG. 4 is a view provided to explain a data conversion processing procedure of the cook top, according to an embodiment of the present disclosure.

FIG. 4 is a view provided to explain a data conversion processing procedure of the cook top, according to another embodiment of the present disclosure.

According to illustrations in FIG. 4, regarding a data packet being transmitted from the user terminal device 300 to the cook top 100, a data packet for controlling the cook top 100 and a data packet for controlling the range hood 200 may be distinguished according to different CLS ID 41 values.

The processor 140 may read the CLD ID 41 value included in a payload of the data packet received from the user terminal device 300, and determine whether it is data for controlling the cook top 100 or data for controlling the range hood 200, and if it is determined that the data is for controlling the range hood 200, the processor 140 may convert the data into a data form of a first communication method and transmit the same to the range hood 200. For this purpose, the CLS ID of the cook top 100 and the CLS ID of the range hood 200 may be pre-stored in a storage 150, and the processor 140 may compare the pre-stored CLS ID and the CLS ID 41 value included in the payload of the data packet, and determine whether the data is for controlling the cook top 100 or for controlling the range hood 200.

For example, the second communicator 132 may convert wireless communication data received from the user terminal device 300 into UART communication data, and the processor 140 may detect the data packet for controlling the range hood 200 from the converted UART communication data packet based on the CLS ID 41 value included in the payload. The processor 140 converts the detected data packet into a data packet form of the Bluetooth communication method and transmits the same to the range hood 200.

Figure 5:
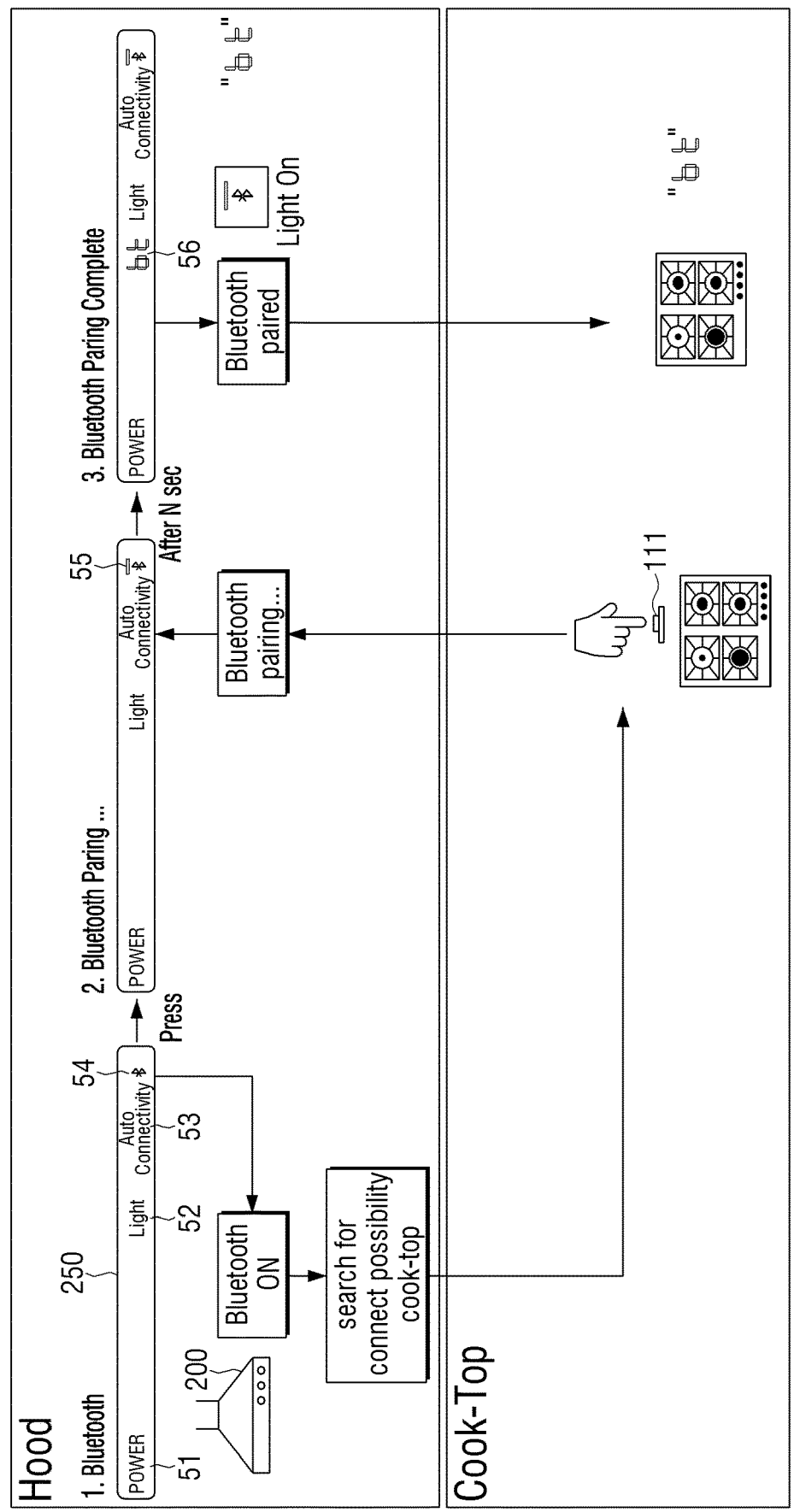
FIG. 5 is a view provided to explain a pairing process of the cook top and the range hood, according to an embodiment of the present disclosure.

FIG. 5 is a view provided to explain the pairing processing of the cook top and the range hood, according to an embodiment of the present disclosure.

According to FIG. 5, the inputter 250 of the range hood 200 includes a power source key 51 for supplying power source, a lighting key 52 for turning ON/OFF the light 270, an auto connectivity key 53 and a pairing key 54 for performing pairing with the cook top 100. As illustrated in FIG. 5, the inputter 250 may be integrated with the display 260 and be realized as a touch display, in which case a key and an area displaying an indicator representing operations of that key coincide with each other.

When the user inputs the pairing key 54, the Bluetooth module included in the communicator 220 operates to perform operations of searching for a cook top with which Bluetooth connection can be made. Here, when the user inputs the pairing key 111 included in the inputter 110 of the cook top 100 with which the user intends to make Bluetooth connection, the Bluetooth module included in the first communicator 131 operates to perform Bluetooth pairing between the cook top 100 and the range hood 200. When the pairing is being performed, a flash light 55 is displayed above the pairing key 54, and when the pairing is completed, "bt" 56 may be displayed on an area of the display 260 as an indicator to show that the pairing is completed, and the flash light 56 may stay on without further flashing. Further, "bt" may also be displayed on an area of the display 160 provided in the cook top 100 as an indicator to show that the pairing is completed.

Meanwhile, in the case where the auto connectivity key 53 is input to turn ON an automatic connection function, when the cook top 100 is operated to initiate cooking, the exhaust fan 210 of the range hood 200 may operate automatically, and when the cook top 100 is stopped from operating, the exhaust fan 210 of the range hood 200 may automatically stop operating. Specifically, when the automatic connection function is turned ON, the range hood 200 may transmit to the cook top 100 a signal notifying that the automatic connection function is turned ON, and when the cooker 120 is operated to initiate cooking, the cook top 100 that received the signal may transmit to the range hood 200 a signal notifying that the cooker 120 is being operated or a control signal for operating the exhaust fan 210 of the range hood 200. In response to receiving the signal from the cook top 100, the processor 230 of the range hood 200 may control the exhaust fan 210 to operate automatically.

Further, when the cooker 120 is stopped from operating in the cook top 100 that received the signal notifying that the automatic connection function is turned ON, the cook top 100 may transmit to the range hood 200 a signal notifying that the cooker 120 is stopped from operating or a control signal for stopping the exhaust fan 210 of the range hood 200 from operating. In response to receiving that signal from the cook top 100, the processor 230 of the range hood 200 may control the exhaust fan 210 to stop operating.

The pairing key 54 may perform two kinds of functions depending on the duration of time it is pressed. For example, pairing between the cook top 100 and the range hood 200 may be performed only when the user presses the pairing key 54 for a predetermined duration of time or more (for example, three seconds), and while the pairing is being performed, the pairing key 54 is operated as a pairing ON/OFF selecting key for momentarily disconnecting or re-connecting the Bluetooth pairing.

Meanwhile, in a state where the cook top 100 and the range hood 200 are paired, peer Bluetooth data may be pre-stored in a respective storage 150, 250 so that even when the power source of either side is turned OFF due to blackout, automatic pairing can be performed as soon as the power source is turned ON. The peer Bluetooth data may be stored in the storage 150, 240 every time the pairing is performed. Accordingly, even when the power source of either side is turned OFF due to blackout and the like, the pairing procedure need not be gone through again from the beginning, and thus it is possible to save the duration of time necessary in the pairing.

Figure 6:
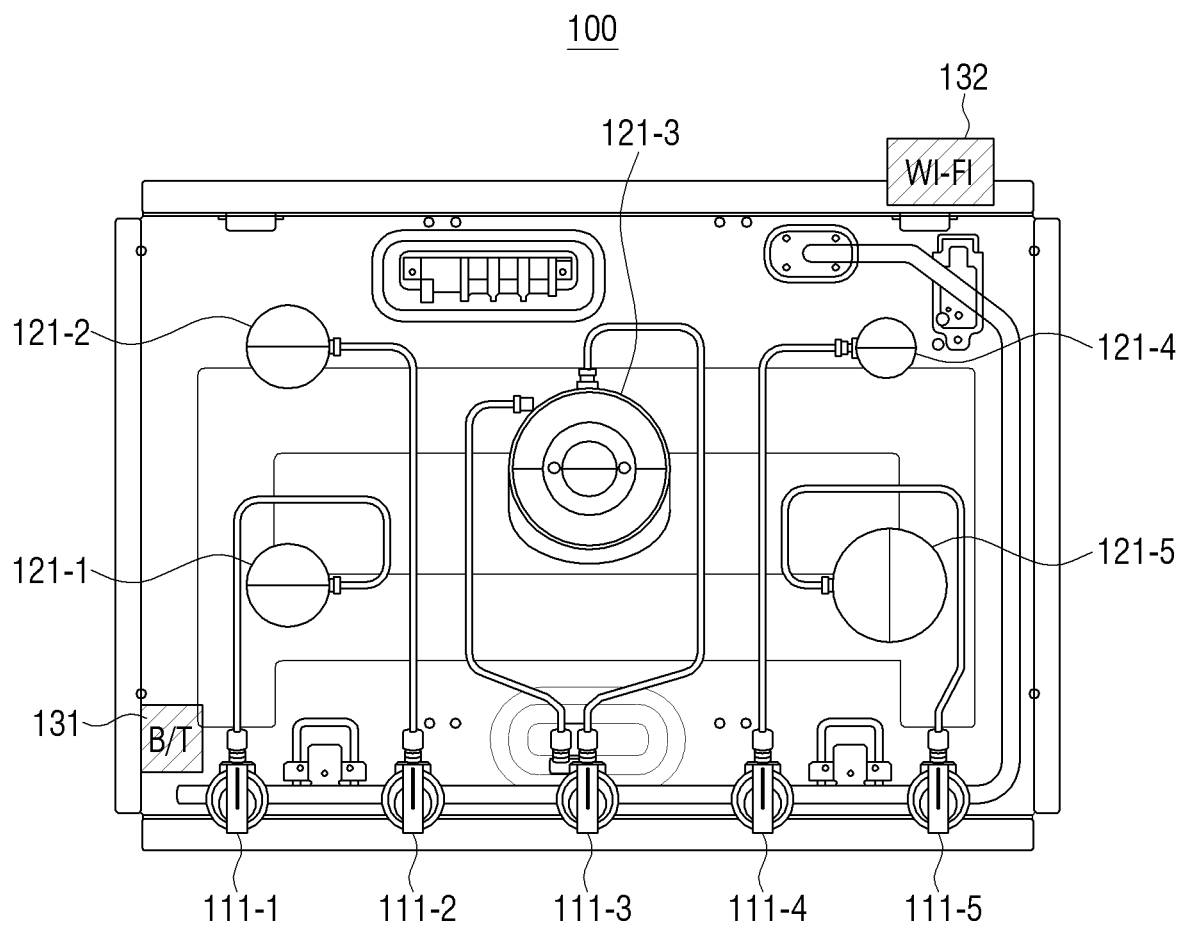
FIG. 6 is a view provided to explain a structure of the cook top, according to an embodiment of the present disclosure.

FIG. 6 is a view provided to explain a structure of the cook top, according to an embodiment of the present disclosure.

According to the embodiment illustrated in FIG. 6, the cook top 100 may be realized as a gas range that uses gas fuel. The cook top 100 may include five burners of different sizes 121-1 to 121-5 included in the cooker 120, and may include dial type switches 111-1 to 111-5 for manipulating the fire power (output) for each of the burners. Here, the Bluetooth module 131 and the Wi-Fi module 132 included in the cook top 100 are disposed as far away as possible from each other in order to prevent deterioration by the burners, and the Bluetooth module 131 is installed inside one surface of the main body of the cook top 100, and the Wi-Fi module 132 is installed at an outer side of the one surface of the main body of the cook top 100. Further, the Bluetooth module 131 and the Wi-Fi module 132 are disposed in a direction where a relatively small burner is located, thereby minimizing the deterioration and external damage by the burners.

Figure 7A:
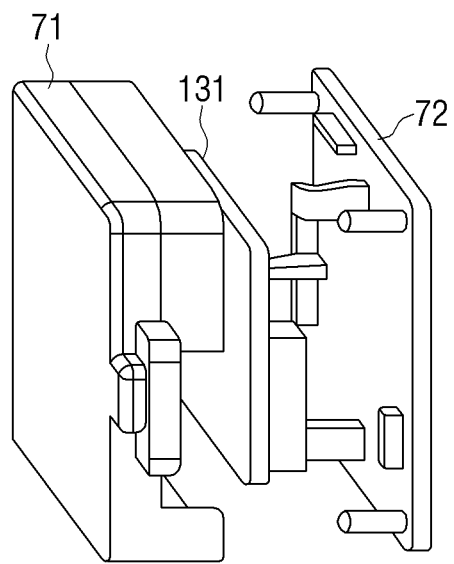
FIGS. 7A and 7B are views provided to explain a structure of a Bluetooth module provided in the cook top, according to an embodiment of the present disclosure.
Figure 7B:
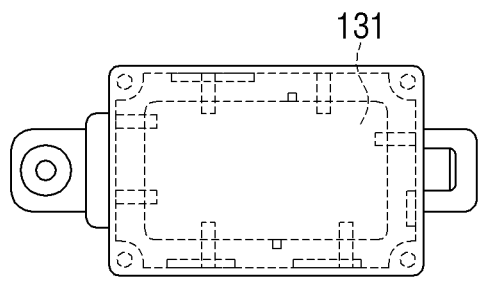

FIGS. 7A-7B are views provided to explain a structure of the Bluetooth module provided in the cook top, according to an embodiment of the present disclosure.

As illustrated in FIG. 7A, the Bluetooth module 131 may include holders 71, 72 included inside the Bluetooth module 131, and the holders 71, 72 may be assembled such that projections protruding from a plurality of grooves provided in the first holder 71, the projections corresponding to the grooves of the second holder 72, form an inner space as they are geared as illustrated in FIG. 7B, and the Bluetooth module 131 is included in the inner space. It is preferable that the holders 71, 72 are made of material that has strong resistance to heat, for example, PCB.

FIGS. 8A-8C are views provided to explain a structure of the Wi-Fi module provided in the cook top, according to an embodiment of the present disclosure.

As illustrated in FIG. 8A, the Wi-Fi module 132 may include holders 81, 82 that include the Wi-Fi module inside thereof, and just as the Bluetooth module 131, the holders 81, 82 may be assembled such that projections protruding from a plurality of grooves provided in the first holder 81, the projections corresponding to the grooves of the second holder 82, form an inner space as they are geared, and the Wi-Fi module 132 is included in the inner space. The holders 81, 82 of the Wi-Fi module 132 may be made of PCB as well.

Specifically, as illustrated in FIG. 8B, the Wi-Fi module 132 includes holes corresponding to the projections 83, 84 of the second holder 82, and the projections 83, 84 are bound in these holes. Especially, the second holders 82 may include stumbling blocks 85, 86 configured to seat the Wi-Fi module 132 and a mis-assembly prevention block 87. That is, the Wi-Fi module 132 may be attached to the second holder 82 in a structure where the Wi-Fi module 132 is fitted to the stumbling blocks 85, 86 of the second holder 82, wherein the mis-assembly prevention block 87 is provided on a lower portion where the Wi-Fi module 132 of the second holder 82 is attached as illustrated in FIG. 8C, thereby preventing the Wi-Fi module 132 from being bound in a wrong direction.

Figure 9:
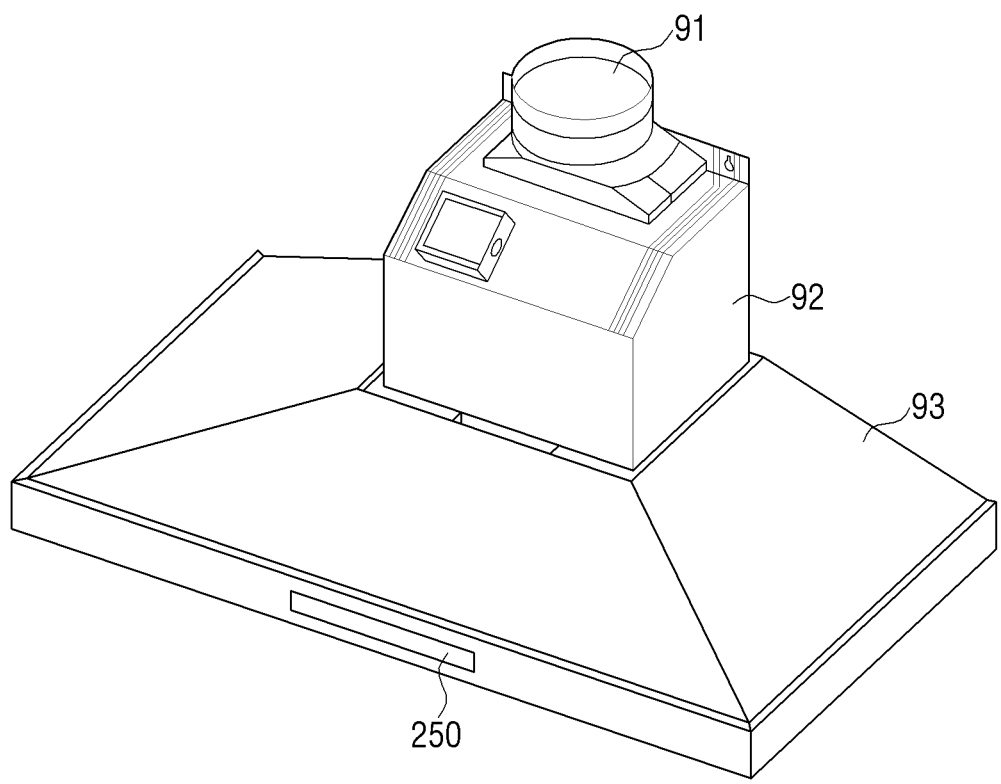
FIGS. 9 and 10 are views provided to explain a structure of the range hood, according to an embodiment of the present disclosure.
Figure 10:
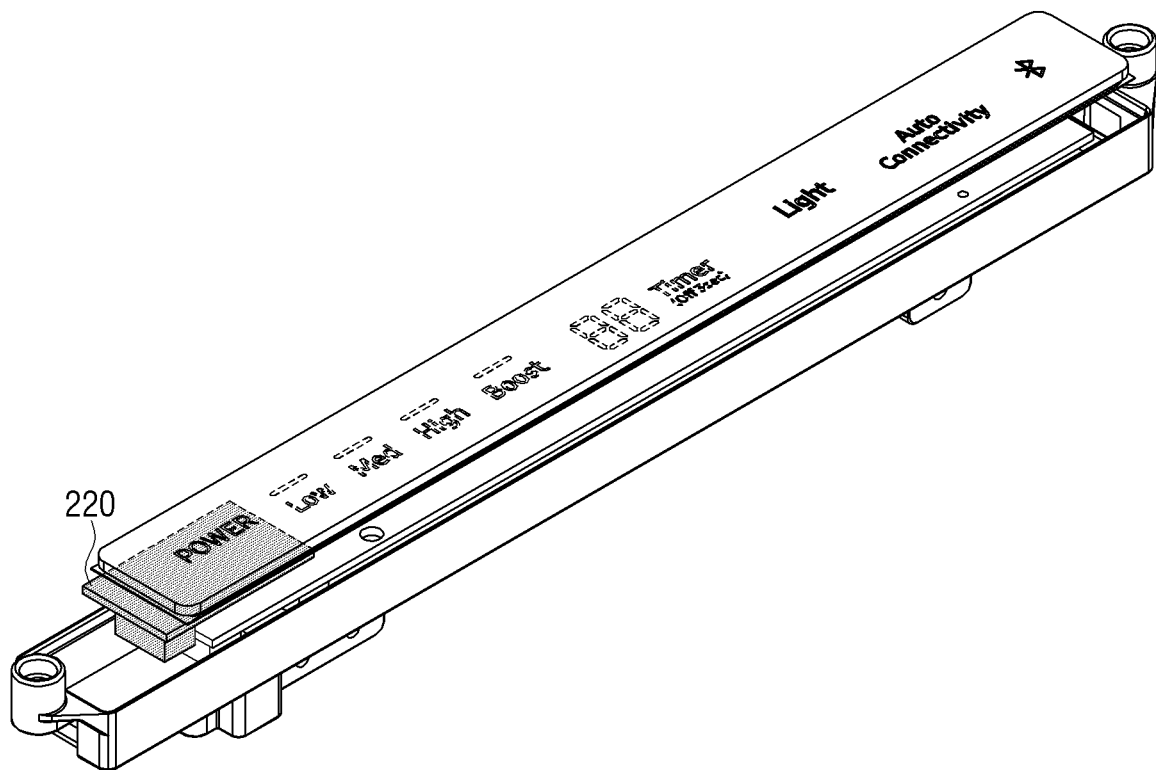

FIG. 9 and FIG. 10 are a view provided to explain a structure of the range hood, according to an embodiment of the present disclosure.

FIG. 9 is a view provided to explain an exterior structure of the range hood 200, according to an embodiment of the present disclosure. As illustrated in FIG. 9, one end of the main body 92 of the range hood 200 is connected with the exhaust pipe 91, and indoor air may be discharged outside through the exhaust pipe 91. The other end of the main body 93 may be connected with the exhaust plate 93 that includes the exhaust fan 210, and the inputter 250 may be included at a side surface of the exhaust plate 93. According to the embodiment of FIG. 10, the inputter 250 is produced in an integral form bound with the display 260, and thus, in an area where each key of the inputter 250 is located, information related to the function of that key may be displayed. Further, the display 260 may be realized as a touch display that includes the inputter 250. As illustrated in FIG. 10, the Bluetooth module 220 may be attached to the range hood 200 in a form where it is disposed on a bottom end of a lower portion of the inputter 250 and the display 260 such that it does not overlap with the inputter 250 and the display 260.

FIGS. 11A-11D are views illustrating a cook top control UI of the user terminal device, according to an embodiment of the present disclosure.

Figure 11A:
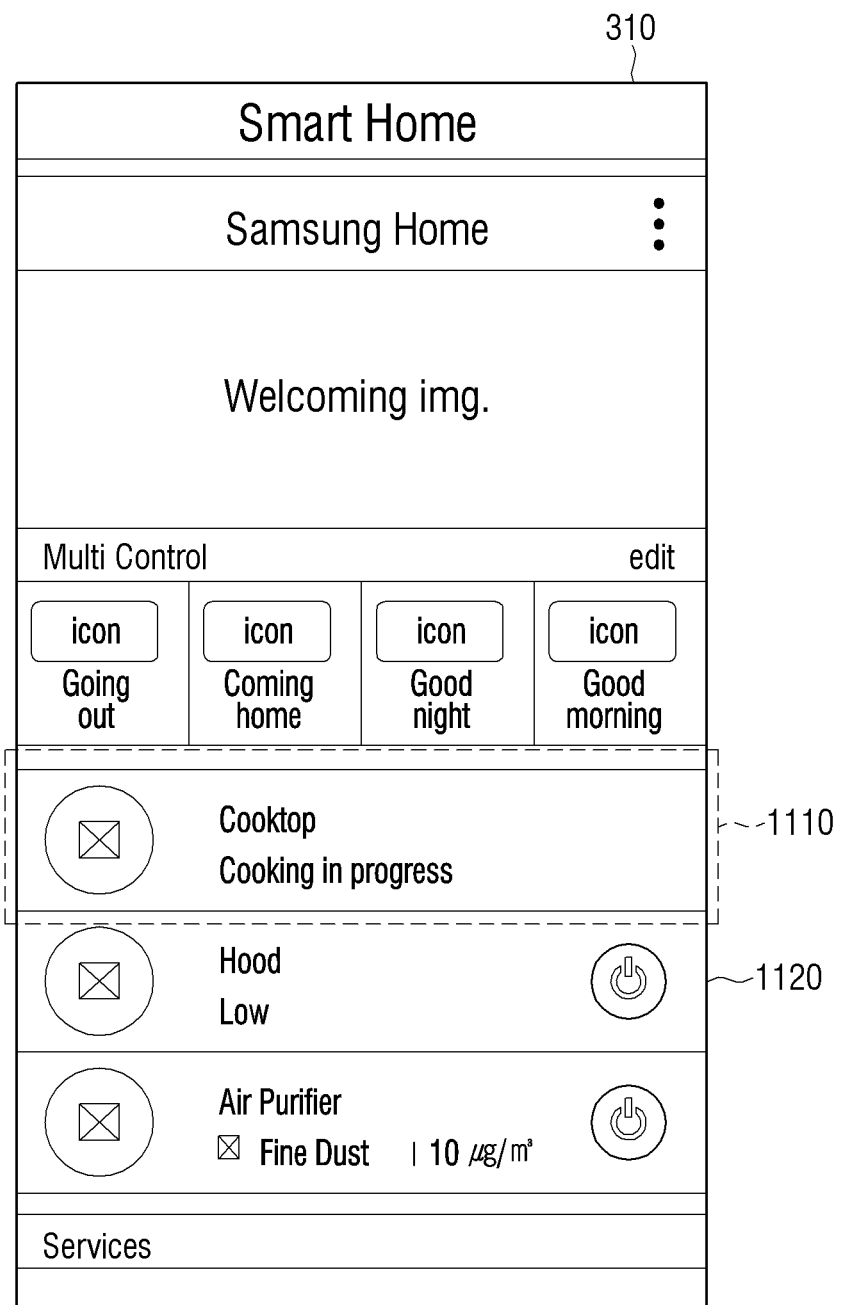
FIGS. 11A-11D are views illustrating a cook top control UI of a user terminal device, according to an embodiment of the present disclosure.

As illustrated in FIG. 11A, on the display 310 provided in the user terminal device 300, a UI screen for controlling the cook top 100 or the range hood 200 may be displayed. The UI screen that may control the cook top 100 or the range hood 200 may be a screen provided as an application for controlling a plurality of home appliances is executed in the user terminal device 300.

When the application for controlling the home appliances is executed, menus for controlling various home appliances, including a menu 1110 for controlling the cook top 100 and a menu 1120 for controlling the range hood 200 are displayed, and when one of the menus is selected, a UI screen for controlling the home appliance corresponding to the selected menu may be displayed. On each menu 1110, 1120, information ("Cooking in progress", "Low") showing the operating state of the home appliance corresponding to each menu may be displayed.

Figure 11B:
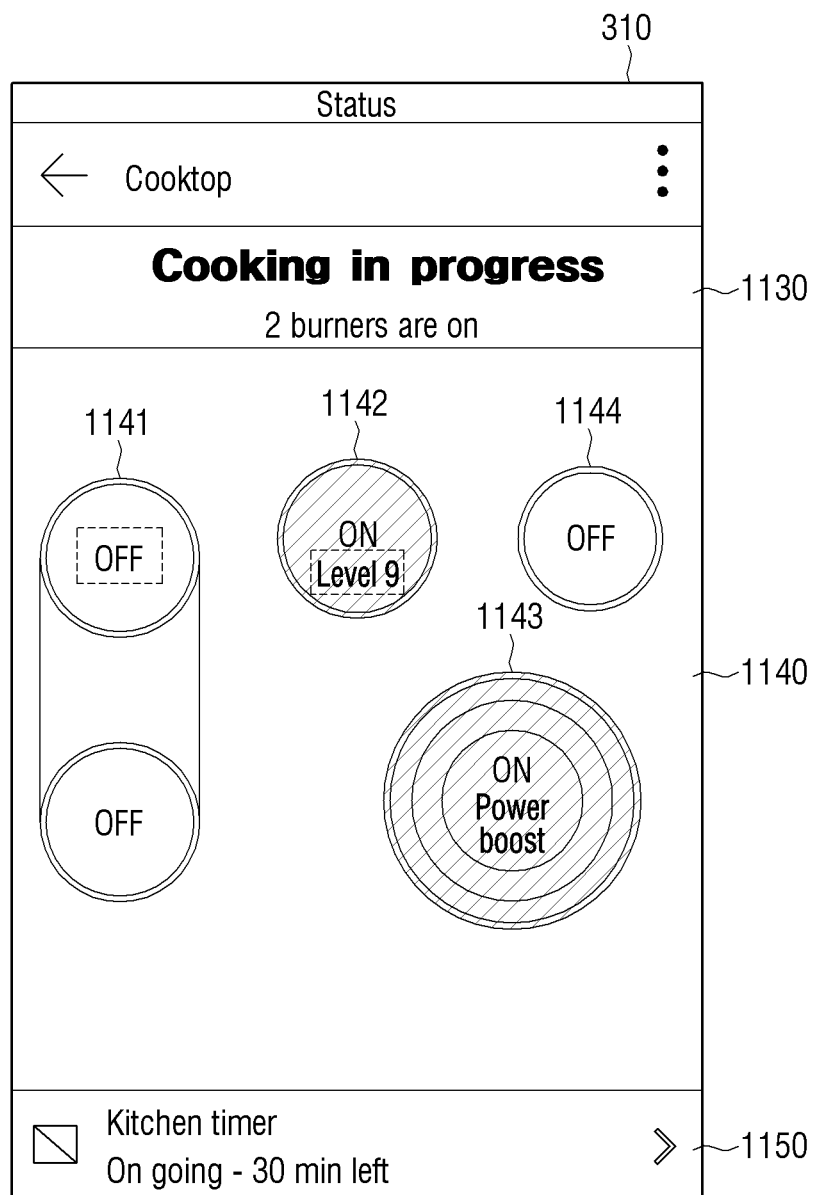

When the menu 1110 for controlling the cook top 100 is selected, as illustrated in FIG. 11B, a UI showing the operating state of the cooker 120 of the cook top 100 may be displayed. This UI may include a first area 1130 briefly showing the operating information of the cooker 120, a second area 1140 representing an area that shows the operating information of the cooker 120 in more detail, and a third area 1150 showing the remaining time according to the set timer.

The user terminal device 300 receives from the cook top 100 specifically the ON/OFF state information of each burner included in the cooker 120 of the cook top 100 and the state information of the cook top 100 including the fire power intensity information of each burner, and displays in the second area 1140 the information of ON/OFF and fire power intensity of each burner based on the received state information. Here, the information of ON/OFF and fire intensity of each burner may be provided by a UI where GUIs 1141 to 1144 representing each burner correspond to the size and actual placement of each burner in the cook top 100, as illustrated in FIG. 11B. In each of the GUIs 1141 to 1144, the ON/OFF information of the corresponding burner is displayed, and on the GUI 1142, 1143 corresponding to the burner in ON state, information of the fire power level such as "Level 9" and "Power boost" may also be displayed. Generally, the higher the level the higher the fire power.

If at least one of the burners of the cook top 100 is being operated in the fire power of a predetermined level or more, the user terminal device 300 may display in the first area 1130 a phrase ("cooking in progress") or a sign notifying that the cook top 100 is in a cooking progress, and when, for example, two of the burners of the cook top 100 are in ON state, a phrase such as "2 burners are on" notifying the number of the burners in ON state may be displayed.

Figure 11C:
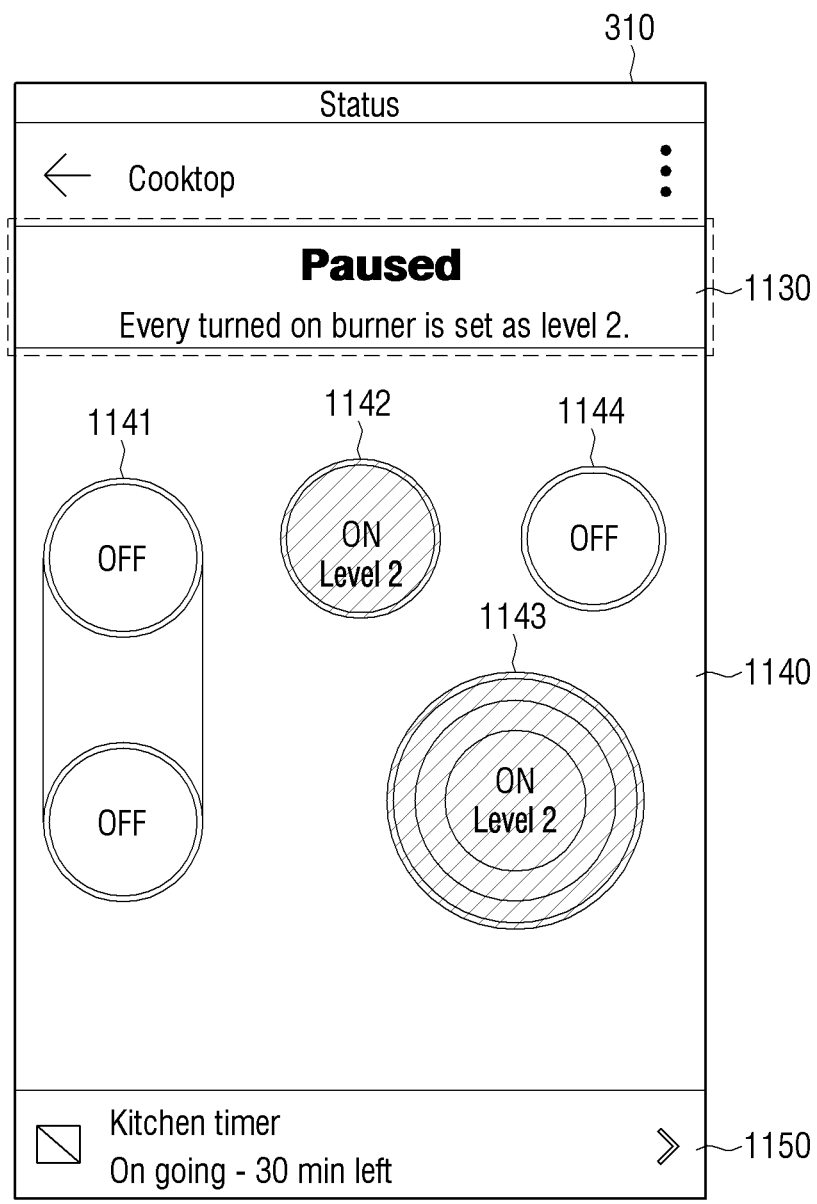

If operation of the cook top 100 is temporarily paused through the inputter 110 of the cook top 100, the burner in ON state may be adjusted to a lower fire power level of "level 2" as illustrated in FIG. 11C, and on the GUI 1142, 1143 corresponding to the burner in ON state displayed in the second area 1140, a fire power level adjusted to such as "level 2" may be displayed. Further, in the first area 1130, a phrase ("paused") or a sign that notifies that the cook top 100 is stopped from operating may be displayed, and a phrase such as "Every turned on burner is set as level 2" notifying that all the burners in ON state are adjusted to level 2 may be displayed.

Figure 11D:
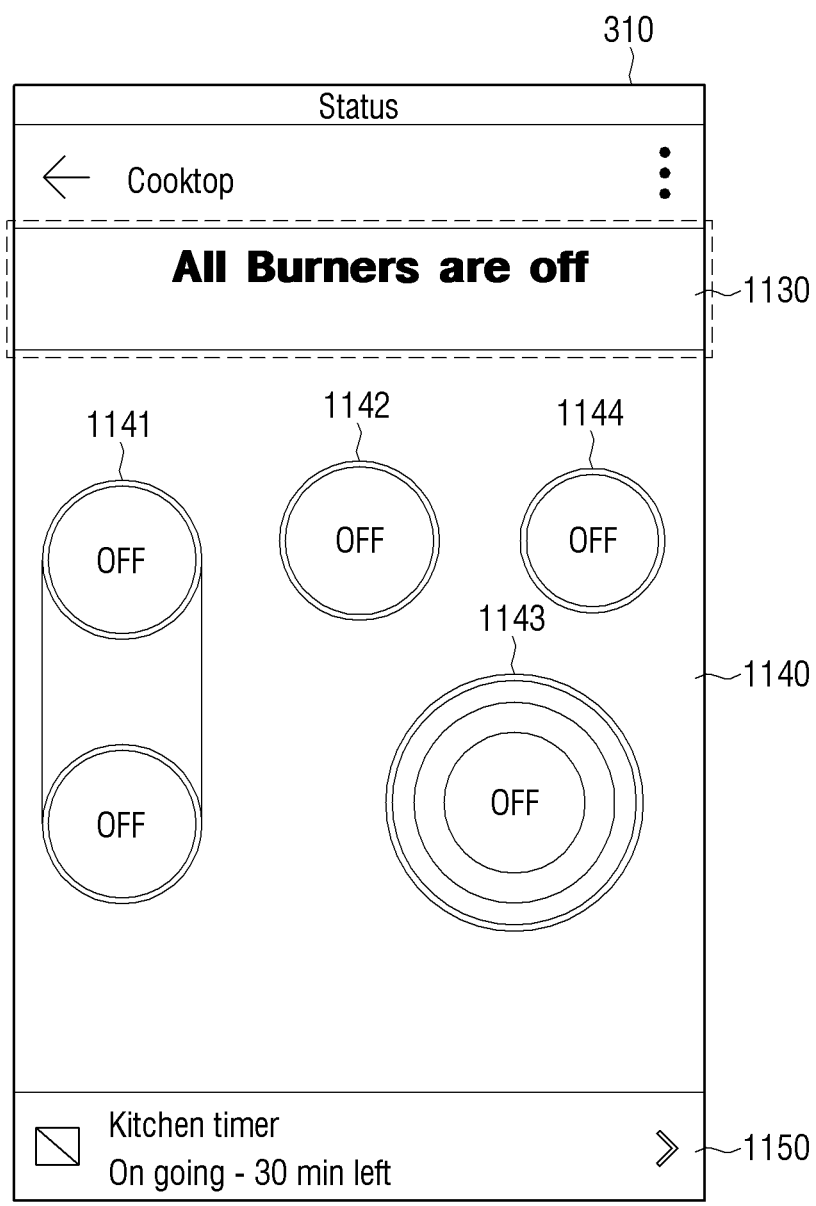

Meanwhile, as illustrated in FIG. 11D, when the power source of the cook top 100 is turned OFF or all the burners are turned OFF, all the GUIs 1141 to 1144 displayed in the second area 1140 may be displayed in OFF state, and in the first area 1130, a phrase such as "All burners are off" notifying that all the burners are turned off may be displayed.

Meanwhile, although not illustrated, when the GUIs 1141 to 1144 displayed in the second area 1140 of the user terminal device 300 is manipulated, it is possible to transmit the manipulating command to the cook top 100, and adjust the ON/OFF and fire power level of the burner of the cook top 100 corresponding to the manipulated GUI.

Figure 12:
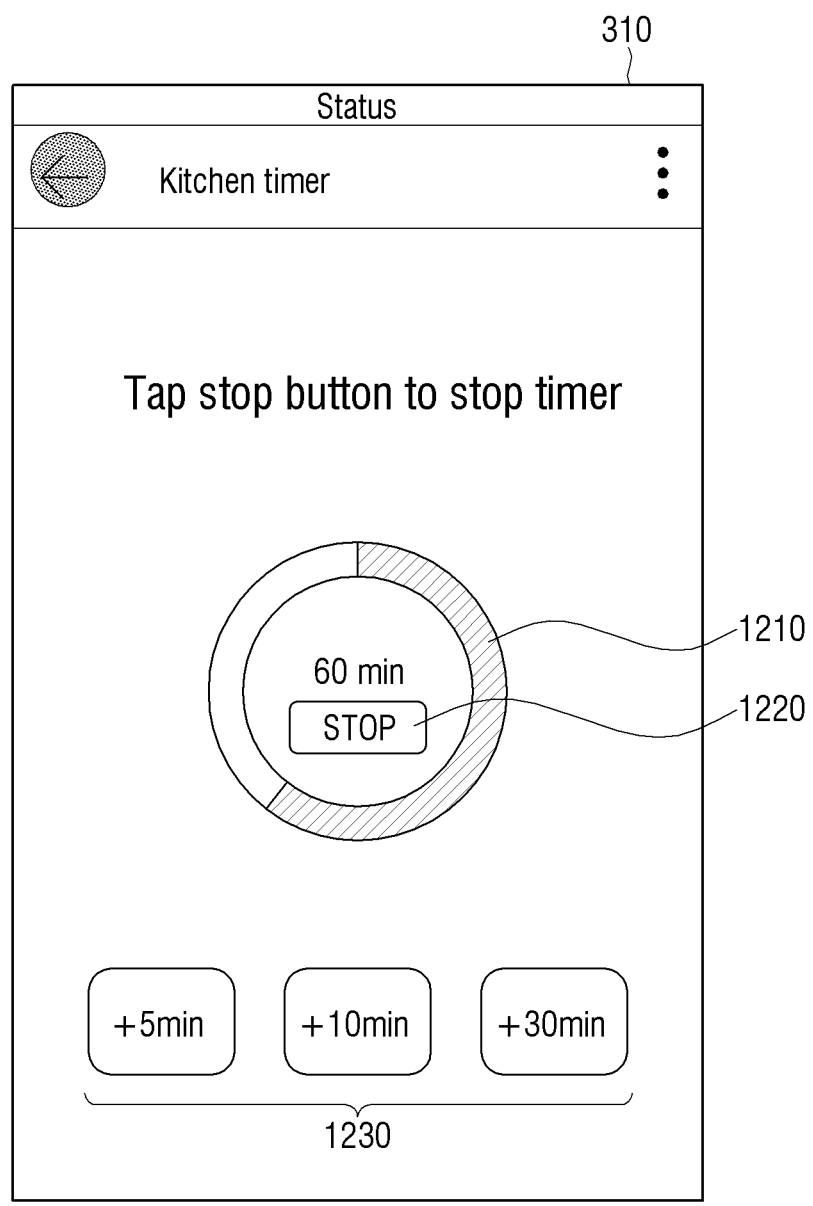
FIGS. 12 and 13 are views illustrating a range hood control UI of the user terminal device, according to an embodiment of the present disclosure.

FIG. 12 is a view illustrating a UI for setting a timer of the cook top, according to an embodiment of the present disclosure.

When the user selects the timer menu of the third area 1150 of the screen displayed on the display 310, as illustrated in FIG. 12, a UI screen for setting the timer of the cook top 100 is displayed. On this UI screen, a donut-type bar 1210 for displaying the time left until the timer ends and the elapsed time may be displayed, and in the center of a donut-shaped bar 1210, the left time (60 min) and a STOP button 1220 for stopping the timer may be displayed. On the bottom end of the screen, a button 1230 for simply manipulating the time being set at the timer may be displayed, and this button 1230 is for adding 5 minutes, 10 minutes or 30 minutes such as by "+5 min", "+10 min" and "+30 min" to the time being set by the user. With this button 1230, the user may add a predetermined time or a directly input time to the time being set in the timer. Otherwise, the user may touch and drag the bar 1210 to adjust the time being set in the timer.

When the user sets the time of the timer in the UI screen for setting the timer of the cook top 100, the set time information is transmitted to the cook top 100, the timer 180 of the cook top 100 counts the set time, and transmits the count information to the user terminal device 300 through the second communicator 132. Based on the received count information, the user terminal device 300 may display on the bar 1210 the time elapsed since the count began and the time left until the end of count, and may display the same in the center of the bar in text form. When the count ends, the cook top 100 may transmit the count end information notifying that the count ended to the user terminal device 300, and when the user terminal device 300 receives the count end information, the cook top 100 may provide a notice through sound or screen.

Figure 13:
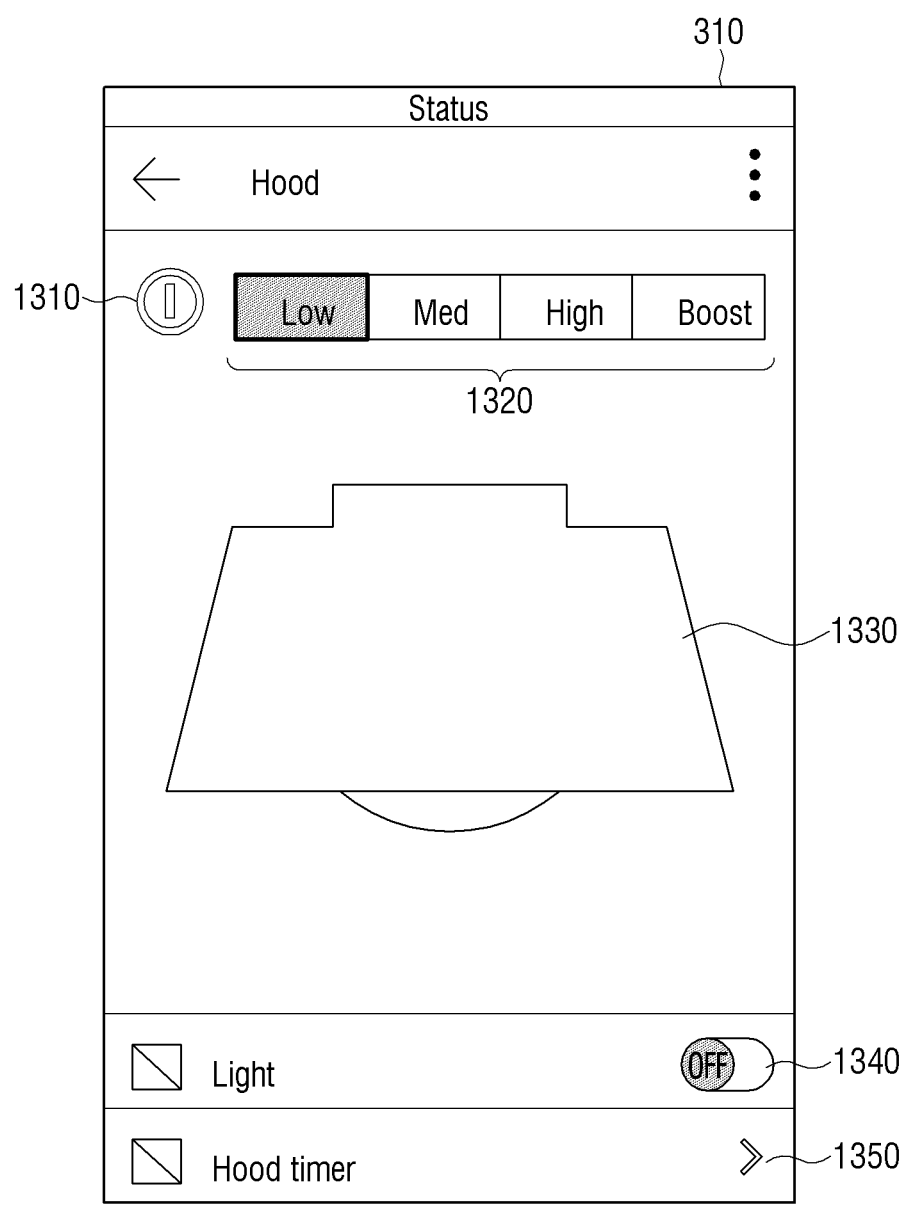

FIG. 13 is a view illustrating a range hood control UI of the user terminal device, according to an embodiment of the present disclosure.

On the application execution screen for controlling the home appliance illustrated in FIG. 11A, when the user selects the menu 1120 for controlling the range hood 200, as illustrated in FIG. 13, the UI showing the operating state of the range hood 200 may be displayed. At the upper end of the UI displayed, a power source button 1310 for turning ON/OFF the power source of the range hood 200 and an intensity adjustment button 1320 for adjusting the intensity of the exhaust fan 210 may be displayed, and at the middle end of the UI displayed, a GUI 1330 showing the ON/OFF state of the light 270 may be displayed, and at the bottom end of the UI displayed, a button 1340 for manipulating ON/OFF of the light 270 and a button 1350 for operating the timer of the range hood 200 may be displayed. When the user inputs the control command for controlling the range hood 200 by manipulating the aforementioned buttons 1310, 1320, 1340, 1350, the input control command is transmitted to the range hood 200 through the cook top 10, and the operation of the range hood 200 may be controlled according to the received control command. Further, the range hood 200 may transmit information of the operating state (ON/OFF of the exhaust fan 210, intensity of the exhaust fan and ON/OFF of the light 270, etc.) to the user terminal device 300 through the cook top 100, and the user terminal device 300 may display the received information of the operating state of the range hood 200 on the UI showing the operating state of the range hood 200.

Figure 14:
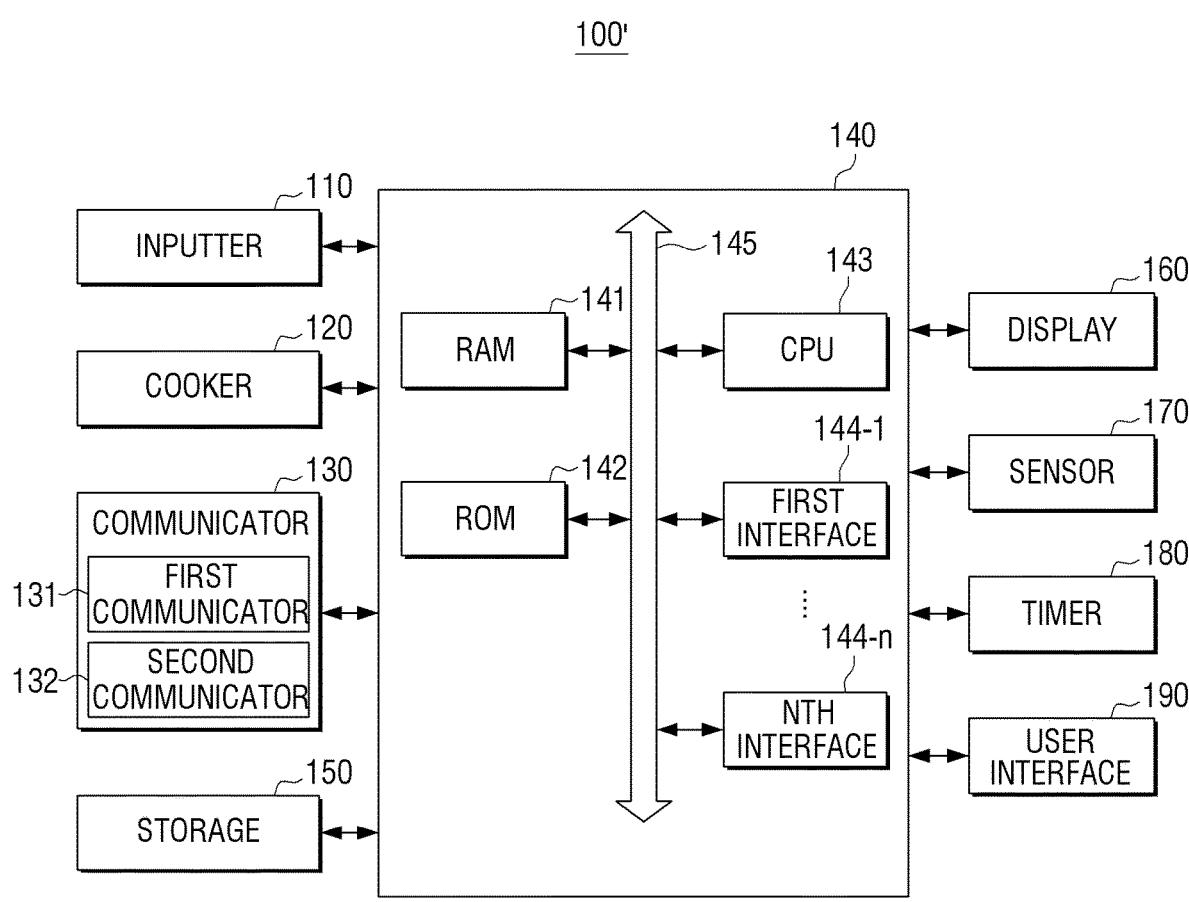
FIG. 14 is a block diagram illustrating in detail a configuration of a cook top, according to another embodiment of the present disclosure.

FIG. 14 is a block diagram illustrating in detail the configuration of the cook top, according to another embodiment of the present disclosure.

As illustrated in FIG. 14, the cook top 100' according to another embodiment of the present disclosure includes an inputter 110, a cooker 120, a communicator 130, a processor 140, a storage 150, a display 160, a sensor 170, a timer 180 and a user interface 190. Hereinafter, configurations overlapping with the configurations described with reference to FIG. 2 will be omitted.

Figure 15:
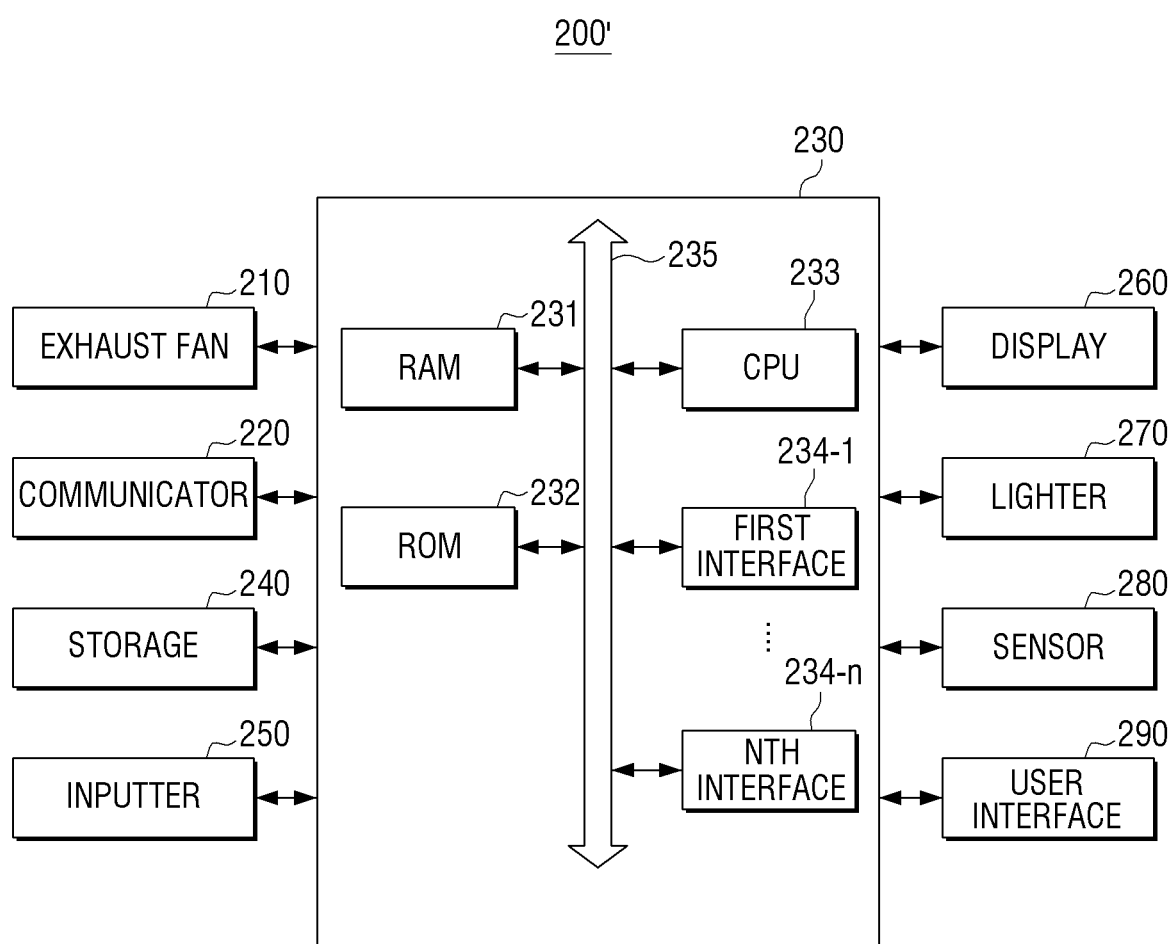
FIG. 15 is a block diagram illustrating in detail a configuration of a range hood, according to another embodiment of the present disclosure.

The processor 140 includes a RAM 141, a ROM 142, a CPU 143, a first to nth interfaces 144-1 to 144-n and a bus 145, as illustrated in FIG. 15. Here, the RAM 141, the ROM 142, the CPU 143 and the first to nth interfaces 144-1 to 144-n may be connected to each other through the buses 145.

The ROM 142 stores command sets and the like for booting the system. The CPU 143 copies in the RAM 141 various programs stored in the storage 150, and executes the programs copied in the RAM 141 to perform various operations.

The CPU 143 accesses the storage 150 to perform booting using the O/S stored in the storage 150. Further, the CPU 143 performs various operations using the various programs stored in the storage 150.

The first to nth interfaces 144-1 to 144-n are connected with the aforementioned various configuration elements. One of the interfaces may be a network interface to be connected with an external device through the network.

The storage 150 may store various modules for operating the cook top 100'. Specifically, the storage 150 may store a base module for processing signals being transmitted from each hardware included in the cook top 100', a storage module for managing a database or registry, a security module, a communication module and the like.

Further, the storage 150 may store connection information for communication connection with the range hood 200 and the user terminal device 300. The processor 140 may perform wireless communication with the range hood 200 and the user terminal device 300 using the connection information stored in the storage 150.

The display 160 is a configuration for displaying a GUI for controlling the cook top 100' or displaying the state of the cook top 100', and may include an LED for displaying the GUI.

The sensor 170 may sense whether or not a cooking device is placed on top of the cooker 120, and for this purpose, the sensor 170 may be provided with any one of a weight sensor and a pressure sensor. When the cooker 120 is operated in a state where there is no cooking device on top of the cooker 120, the processor 140 may automatically stop the operation of the cooker 120 after a predetermined time.

In response to receiving time information from the user terminal device 300 the time set in the timer, the timer 180 counts the set time, and the processor 140 transmits the count information in the timer 180 to the user terminal device 300.

The user interface 190 is a configuration element for sensing user interaction for controlling the overall operations of the cook top 100'. Especially, the interface 190 may include various interaction sensing devices such as a microphone (not illustrated), and an infrared receiver (not illustrated) and the like.

FIG. 15 is a block diagram illustrating in detail a configuration of the range hood, according to another embodiment of the present disclosure.

The range hood 200' according to this another embodiment of the present disclosure includes an exhaust fan 210, a communicator 220, a processor 230, a storage 240, an inputter 250, a display 260, a light 270, a sensor 280 and a user interface 290. Hereinafter, explanation on configurations that overlap with the configurations described with reference to FIG. 3 will be omitted.

As illustrated in FIG. 15, the processor 230 includes a RAM 231, a ROM 232, a CPU 233, a first to nth interfaces 234-1 to 234-n and a bus 235. Here, the RAM 231, the ROM 232, the CPU 233, and the first to nth interfaces 234-1 to 234-n may be connected to each other through the buses 235.

In the ROM 232, command sets and the like for system booting are stored. The CPU 233 copies in the RAM 231 various programs stored in the storage 240, and executes the programs copied in the RAM 231 to perform various operations.

The CPU 233 accesses the storage 240 and performs booting using the O/S stored in the storage 240. Further, the CPU 233 performs various operations using the various programs stored in the storage 240.

The first to nth interfaces 234-1 to 234-n are connected to the aforementioned various configuration elements. One of the interfaces may be a network interface connected with an external device through the network.

The storage 240 may store various modules for operating the range hood 200'. Specifically, the storage 240 may store a base module for processing signals being transmitted from each hardware included in the range hood 200', a storage module managing a database or a registry, a security module, a communication module and the like.

Further, the storage 240 may store connection information for communication connection with the range hood 200' and the cook top 100. The processor 140 may perform wireless communication with the cook top 100 using the connection information stored in the storage 240.

The display 260 is a configuration for displaying a GUI for controlling the range hood 200' or displaying the state of the range hood 200', and may include an LED for displaying the GUI.

The light 270 is a configuration provided at a bottom end of the main body of the range hood 200' to provide light to the cook top 100. ON/OFF of the light 270 may be controlled according to manipulation of the inputter 250 or remote control of the user terminal device 300.

The sensor 280 is a configuration for sensing smoke or steam generated in the cook top 100. When the smoke or steam is sensed through the sensor 280, the processor 230 may provide a notice to notify the user of the smoke or steam or automatically operate the exhaust fan 210. The method for providing the notice may display the notice through the display 260, or transmit the notice information to the user terminal device 300 through the cook top 100.

Figure 16:
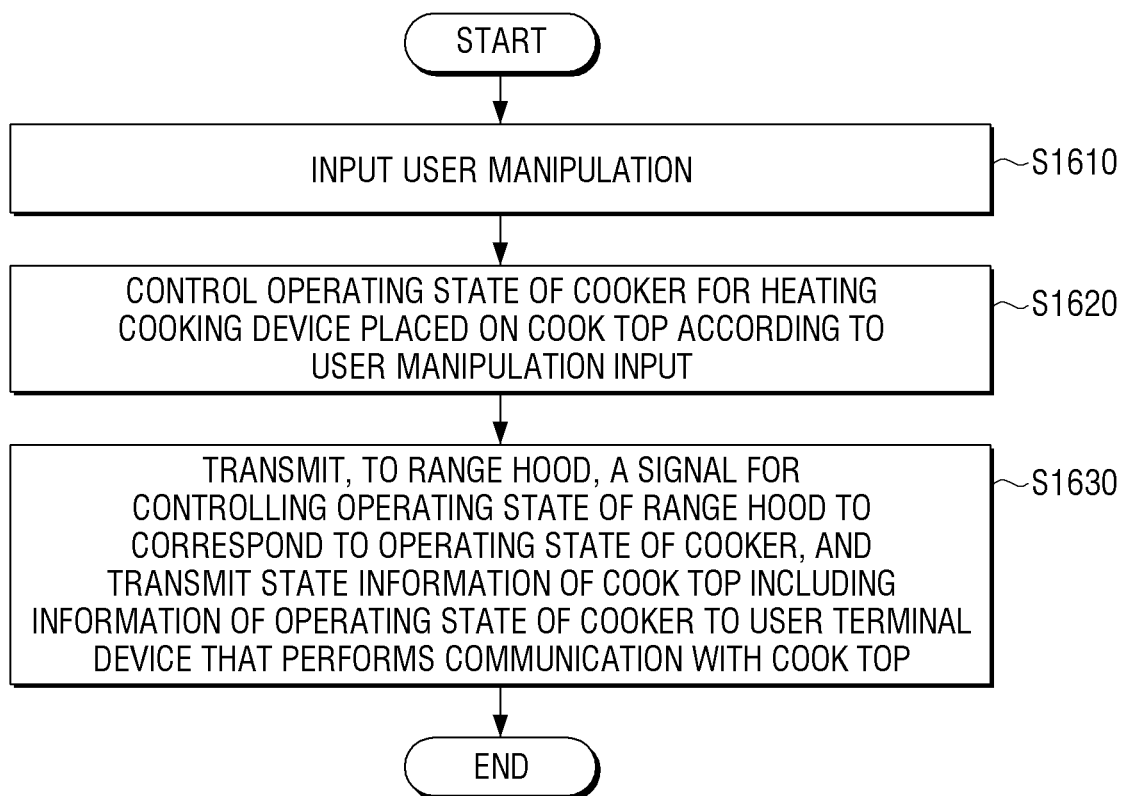
FIG. 16 is a flowchart provided to explain a control method of the cook top, according to an embodiment of the present disclosure.

FIG. 16 is a flowchart provided to explain the control method of the cook top, according to an embodiment of the present disclosure.

Initially, a user manipulation is input (S1610).

Then, according to the input user manipulator, the operating state of the cooker for heating the cooking device placed on the cook top is controlled (S1620).

Then, a signal for controlling the operating state of the range hood to correspond to the operating state of the cooker is transmitted to the range hood, and the state information of the cook top including information of the operating state of the cooker is transmitted to the user terminal device that performs communication with the cook top (S1630). Here, when the cooker is operated, it operates the range hood, and when the cooker is stopped from operating, a signal for stopping the range hood from operating may be transmitted to the range hood. Further, the cook top may perform communication with the user terminal device through Wi-Fi, and perform communication with the range hood through Bluetooth. Further, here, the state information of the cook top may include at least one of information of whether or not the cooker is operating, operating state information of each of the plurality of burners included in the cooker, fire power level and timer information.

Further, a control command for controlling the range hood may be received from the user terminal device, and a signal for operating the range hood according to the received control command may be transmitted to the range hood.

Figure 17:
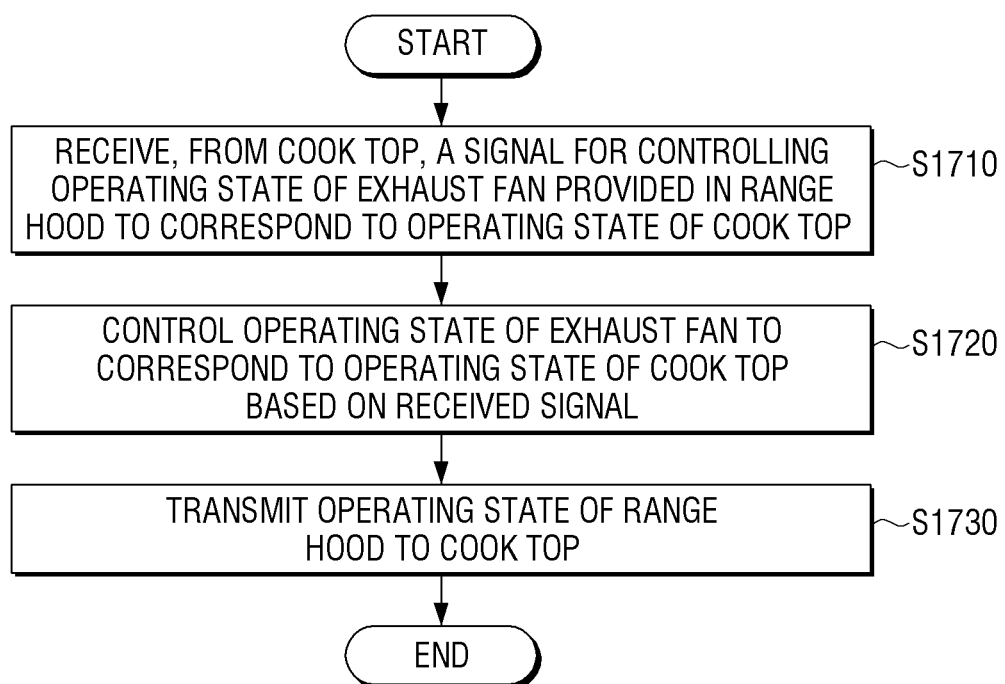
FIG. 17 is a flowchart provided to explain a control method of the range hood, according to an embodiment of the present disclosure.

FIG. 17 is a flowchart provided to explain the control method of the range hood, according to an embodiment of the present disclosure.

First, a signal for controlling the operating state of the exhaust fan is provided in the range hood to correspond to the operating state of the cook top is received (S1710). Prior to this, for communication connection between the cook top and the range hood, as a pairing command is input, pairing with the cook top may be performed, and when the pairing with the cook top is completed, an indicator notifying that the cook top and the range hood are in a paired state may be provided.

Then, the operating state of the exhaust fan is controlled to correspond to the operating state of the cook top based on the received signal (S1720). Here, in response to receiving from the cook top the signal notifying that the cook top is being operated, the exhaust fan may be operated, and in response to receiving from the cook top the signal notifying that the cook top is stopped from operating, the operation of the exhaust fan may be stopped.

Then, the state information of the range hood is transmitted to the cook top (S1730).

As aforementioned, according to various embodiments of the present disclosure, the user may check the operating state of the cook top and the hood and control their operations more conveniently.

The control method of the cook top 100 according the aforementioned various embodiments may be realized as a program and be stored in various record media. That is, a computer program processed by various processors to execute the various aforementioned control methods may be used in a state where it is stored in a record medium.

For example, a non-transitory computer readable medium may be provided, the medium storing a program configured to perform a step of receiving input of a user manipulation, a step of controlling an operation state of the cooker for heating a cooking device placed on the cook top according to the input user manipulation, and a step of transmitting to the range hood a signal for controlling the operating state of the range hood to correspond to the operating state of the cooker, and transmitting the state information of the cook top including information of the operating state of the cooker to the user terminal device configured to perform communication with the cook top.

The non-transitory computer readable medium refers to not a medium that stores data for a short period of time such as a register, cache, memory and the like, but a medium readable by devices and that stores data semi-permanently. Specifically, the aforementioned various middleware or programs may be stored in a non-transitory computer readable medium such as a CD, DVD, hard disk, blue ray disk, USB, memory card, ROM and the like may be provided.

The foregoing exemplary embodiments and advantages are merely exemplary and are not to be construed as limiting the present invention. The present teaching can be readily applied to other types of apparatuses. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A cook top comprising:
   a heating element configured to generate heat in a cooking utensil;
   a first communicator configured to perform communication with a range hood;
   a second communicator configured to perform communication with a user terminal device; and
   a processor configured to:
      control an operating state of the heating element in response to an input, and
      transmit, via the first communicator, a first signal to the range hood, the first signal including first information for controlling an operating state of the range hood, and
      transmit, via the second communicator, a second signal to the user terminal device, the second signal including first state information of the heating element and range state information of the range hood.

2. The cook top according to claim 1,
   wherein the processor is further configured to:
   receive, via at least one of the first communicator and the second communicator, one or more packets from the user terminal device;
   determine, based on an identifier in the one or more packets, whether to adjust the operating state of the heating element or the operating state of the range hood;

generate the first signal when the identifier corresponds to the range hood; and generate a heating element command signal when the identifier corresponds to the heating element.

3. The cook top according to claim 1, wherein the processor is configured to:

generate the first signal in response to the operating state of the heating element; and wherein information comprises a first setting to set a first state of the range hood when the heating element is operated or a second setting for ceasing operation of the range hood when operation of the heating element is ceased.

4. The cook top according to claim 1, wherein the processor is configured to vary an operating speed of the range hood corresponding to a power or flame level of one or more of a plurality of heating elements.

5. The cook top according to claim 1, wherein the first communicator and the second communicator comprise:

a Bluetooth module configured to perform communication with the range hood in a Bluetooth method; or a Wi-Fi module configured to perform communication with the user terminal device in a Wi-Fi method.

6. The cook top according to claim 5, wherein the heating element comprises a plurality of burners configured to convert electric energy into thermal energy to generate heat; and an upper plate provided at an upper side of at least one of the burners to transmit heat to the cooking utensil, wherein the Bluetooth module and the Wi-Fi module are spaced apart from each other and are installed on different surfaces on a main body of the cook top to reduce signal interference.

7. The cook top according to claim 6, wherein the Bluetooth module includes an inner space formed as a first holder including at least one groove and a second holder including a projection corresponding to the groove, and wherein the first holder and the second holder are geared to each other.

8. The cook top according to claim 6, wherein the Wi-Fi module includes an inner space formed as a first holder including at least one groove and a second holder including a projection corresponding to the groove, wherein the first holder and the second holder are geared to each other, and wherein the Wi-Fi module has a structure that is separable from the cook top, and wherein the second holder includes a stumbling block configured to seat the Wi-Fi module and a mis-assembly prevention block.

9. The cook top according to claim 1, wherein the processor is configured to:

determine the first state information of the heating element, range state information of the range hood, operating state information regarding each of a plurality of heating elements included in the cook top, a power level of one or more of the plurality of heating elements, and timer information; and transmit, to the user terminal device, the first state information, the range state information, the operating state information, the power level, or the timer information.

10. A system comprising:
a cook top; and
a range hood, wherein the cook top is configured to:

control an operating state of a heating element in response to an input, transmit, via a first communicator, a first signal to the range hood, the first signal including first information for controlling an operating state of the range hood, and transmit, via a second communicator, a second signal to a user terminal device, the second signal including first state information of the heating element and range state information of the range hood, wherein the range hood is configured to: based on receiving the first signal from the cook top, operate an exhaust fan and transmit state information of the range hood to the cook top, and wherein the user terminal device is configured to:

receive the state information of the cook top and the state information of the range hood from the cook top, and transmit a control command for controlling the cook top and the range hood to the cook top.

11. The system according to claim 10, wherein the cook top is further configured to:

receive, via at least one of the first communicator and the second communicator, one or more packets from the user terminal device;

determine, based on an identifier in the one or more packets, whether to adjust the operating state of the heating element or the operating state of the range hood;

generate the first signal when the identifier corresponds to the range hood; and generate a heating element command signal when the identifier corresponds to the heating element.

12. The system according to claim 10, wherein the cook top is further configured to generate the first signal in response to the operating state of the heating element, and wherein information comprises a first setting to set a first state of the range hood when the heating element is operated or a second setting for ceasing operation of the range hood when operation of the heating element is ceased.

13. The system according to claim 10, wherein the cook top is further configured to:

vary an operating speed of the range hood corresponding to a power or flame level of one or more of a plurality of heating elements.

14. The system according to claim 10, wherein the first communicator and the second communicator comprise at least one of:

a Bluetooth module configured to perform communication with the range hood in a Bluetooth method; or a Wi-Fi module configured to perform communication with the user terminal device in a Wi-Fi method.

15. The system according to claim 14, wherein the heating element comprises:

a plurality of burners configured to convert electric energy into thermal energy to generate heat; and an upper plate provided at an upper side of at least one of the burners to transmit heat to a cooking utensil, and wherein the Bluetooth module and the Wi-Fi module are spaced apart from each other and are installed on different surfaces on a main body of the cook top to reduce signal interference.

16. The system according to claim 15, wherein the Bluetooth module includes an inner space formed as a first holder including at least one groove and a second holder including a projection corresponding to the groove, and wherein the first holder and the second holder are geared to each other.

17. The system according to claim 15,
wherein the Wi-Fi module includes an inner space formed as a first holder including at least one groove and a second holder including a projection corresponding to the groove,
wherein the first holder and the second holder are geared to each other,
wherein the Wi-Fi module has a structure that is separable from the cook top, and
wherein the second holder includes a stumbling block configured to seat the Wi-Fi module and a mis-assembly prevention block.

18. The system according to claim 10, wherein the cook top is further configured to:
determine the first state information of the heating element, the range state information of the range hood, operating state information regarding each of a plurality of heating elements included in the cook top, a power level of one or more of the plurality of heating elements, and timer information; and
transmit, to the user terminal device, the first state information, the range state information, the operating state information, the power level, or the timer information.

19. A cook top comprising:
a heating element configured to generate heat in a cooking utensil;
a communicator configured to perform communication with a user terminal device and a range hood; and
a processor configured to:
control an operating state of the heating element in response to an input;
transmit, via the communicator, a first signal to the range hood, the first signal including first information for controlling an operating state of the range hood; and
transmit, via the communicator, a second signal to the user terminal device, the second signal including first state information of the heating element and range state information of the range hood.

20. The cook top according to claim 19,
wherein the processor is further configured to:
receive, via the communicator, one or more packets from the user terminal device;
determine, based on an identifier in the one or more packets, whether to adjust the operating state of the heating element or the operating state of the range hood;
generate the first signal when the identifier corresponds to the range hood; and
generate a heating element command signal when the identifier corresponds to the heating element.

* * * * *